(12) United States Patent
Turnbull

(10) Patent No.: US 7,023,379 B2
(45) Date of Patent: Apr. 4, 2006

(54) VEHICLE REARVIEW ASSEMBLY INCORPORATING A TRI-BAND ANTENNA MODULE

(75) Inventor: Robert R. Turnbull, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 10/406,402

(22) Filed: Apr. 3, 2003

(65) Prior Publication Data

US 2004/0196179 A1 Oct. 7, 2004

(51) Int. Cl.
*G01S 5/14* (2006.01)
*H01Q 1/32* (2006.01)

(52) U.S. Cl. ............. 342/357.1; 343/713; 343/700 MS
(58) Field of Classification Search ................ 343/711, 343/713; 342/357.1; 359/872, 871
See application file for complete search history.

(56) References Cited

U.S. PATENT DOCUMENTS

| | | |
|---|---|---|
| 3,099,797 A | 7/1963 | Piccinini |
| 4,056,696 A | 11/1977 | Meyerle et al. |
| 4,241,870 A | 12/1980 | Marcus |
| 4,247,850 A | 1/1981 | Marcus |
| 4,362,907 A | 12/1982 | Polacsek |
| 4,447,808 A | 5/1984 | Marcus |
| 4,588,267 A | 5/1986 | Pastore |
| 4,625,210 A | 11/1986 | Sagl |
| 4,630,904 A | 12/1986 | Pastore |
| 4,680,787 A | 7/1987 | Marry |
| D294,495 S | 3/1988 | Nissley |
| 4,733,336 A | 3/1988 | Skogler et al. |
| 4,760,394 A | 7/1988 | Takeuchi et al. |
| 4,827,520 A | 5/1989 | Zeinstra |
| 4,870,676 A | 9/1989 | Lewo |
| 4,875,229 A | 10/1989 | Palett et al. |
| 4,881,258 A | 11/1989 | Kaiwa et al. |
| 4,905,270 A | 2/1990 | Ono |
| 4,905,304 A | 2/1990 | Bardon et al. |
| 4,930,742 A | 6/1990 | Schofield et al. |
| 4,943,796 A | 7/1990 | Lee |
| D315,890 S | 4/1991 | Lewo |
| D316,242 S | 4/1991 | Lewo |
| 5,029,233 A | 7/1991 | Metroka |
| D326,450 S | 5/1992 | Watanabe |
| 5,177,685 A | 1/1993 | Davis et al. |
| D337,582 S | 7/1993 | Lewo |
| 5,239,586 A | 8/1993 | Marui |

(Continued)

FOREIGN PATENT DOCUMENTS

EP 0190412 10/1990

(Continued)

OTHER PUBLICATIONS

Hatch, David H., The Counterpoise Learning the SGC SG-239 Antenna Coupler [Smartuner], http://www.wireservices.com/n9zrt/SG-239/counterpoise.html.*

*Primary Examiner*—Gregory C. Issing
(74) *Attorney, Agent, or Firm*—Price, Heneveld, Cooper, DeWitt & Litton, LLP; James E. Shultz, Jr.

(57) ABSTRACT

A rearview assembly includes a mounting structure and a tri-band antenna module. The mounting structure is adapted for mounting to a conductive mounting button that is attached to an inside surface of a vehicle windshield. The tri-band antenna module is mounted adjacent the conductive mounting button and includes a patch antenna and a dual-band cellular antenna.

21 Claims, 18 Drawing Sheets

U.S. PATENT DOCUMENTS

| | | |
|---|---|---|
| 5,299,132 A | 3/1994 | Wortham |
| 5,353,376 A | 10/1994 | Oh et al. |
| 5,398,190 A | 3/1995 | Wortham |
| 5,400,040 A | 3/1995 | Lane et al. |
| 5,454,027 A | 9/1995 | Kennedy et al. |
| 5,455,716 A | 10/1995 | Suman et al. |
| 5,513,111 A | 4/1996 | Wortham |
| 5,519,621 A | 5/1996 | Wortham |
| 5,546,458 A | 8/1996 | Iwami |
| 5,566,224 A | 10/1996 | ul Azam et al. |
| 5,576,687 A | 11/1996 | Blank et al. |
| 5,579,376 A | 11/1996 | Kennedy, III et al. |
| 5,587,236 A * | 12/1996 | Agrawal et al. .............. 428/334 |
| 5,631,638 A | 5/1997 | Kaspar et al. |
| 5,649,316 A | 7/1997 | Prudhomme et al. |
| 5,649,317 A | 7/1997 | Suzuki |
| 5,659,594 A | 8/1997 | Toda |
| 5,671,996 A | 9/1997 | Bos et al. |
| 5,673,325 A | 9/1997 | Andrea et al. |
| 5,745,850 A | 4/1998 | Aldermeshian et al. |
| 5,754,665 A | 5/1998 | Hosoi |
| 5,760,962 A | 6/1998 | Schofield et al. |
| 5,815,820 A | 9/1998 | Kiem et al. |
| 5,829,782 A | 11/1998 | Breed et al. |
| 5,835,607 A | 11/1998 | Martin et al. |
| 5,878,353 A | 3/1999 | ul Azam et al. |
| 5,898,392 A | 4/1999 | Bambini et al. |
| 5,899,956 A | 5/1999 | Chan |
| 5,917,921 A | 6/1999 | Sasaki et al. |
| 5,938,321 A | 8/1999 | Bos et al. |
| 5,940,503 A | 8/1999 | Palett et al. |
| 5,959,581 A * | 9/1999 | Fusinski .............. 343/700 MS |
| 5,971,552 A | 10/1999 | O'Farrell et al. |
| 6,011,518 A | 1/2000 | Yamagishi et al. |
| 6,019,475 A | 2/2000 | Lynam et al. |
| 6,026,162 A | 2/2000 | Palett et al. |
| 6,028,537 A | 2/2000 | Suman et al. |
| 6,081,237 A | 6/2000 | Sato et al. |
| 6,140,975 A | 10/2000 | Cohen |
| 6,166,698 A * | 12/2000 | Turnbull et al. ............. 343/713 |
| 6,202,976 B1 * | 3/2001 | Johnson et al. ............. 248/476 |
| 6,211,824 B1 | 4/2001 | Holden et al. |
| 6,211,831 B1 | 4/2001 | Nagy et al. |
| 6,215,451 B1 | 4/2001 | Hadzoglou |
| 6,246,765 B1 | 6/2001 | Palett et al. |
| 6,249,254 B1 | 6/2001 | Bateman et al. |
| 6,278,377 B1 | 8/2001 | DeLine et al. |
| 6,307,525 B1 | 10/2001 | Bateman et al. |
| 6,326,613 B1 | 12/2001 | Heslin et al. |
| 6,417,809 B1 | 7/2002 | Kadambi et al. |
| 6,420,975 B1 | 7/2002 | DeLine et al. |
| 6,448,932 B1 | 9/2002 | Stoiljkovic et al. |
| 6,477,464 B1 * | 11/2002 | McCarthy et al. .......... 701/213 |
| 6,483,463 B1 | 11/2002 | Kadambi et al. |
| 2003/0107521 A1 * | 6/2003 | Matsuura et al. ........... 343/713 |
| 2003/0164800 A1 * | 9/2003 | Jordan et al. ............... 343/713 |
| 2004/0051661 A1 * | 3/2004 | Wixforth et al. ......... 342/357.1 |

FOREIGN PATENT DOCUMENTS

| | | |
|---|---|---|
| EP | 1078818 | 2/2001 |
| JP | 0385949 | 4/1991 |
| JP | 179989 | 3/1992 |
| JP | 4290044 | 10/1992 |
| JP | 5162590 | 6/1993 |
| WO | 9807208 | 2/1998 |
| WO | 0030211 | 5/2000 |
| WO | WO 02/35646 A1 * | 5/2002 |

* cited by examiner

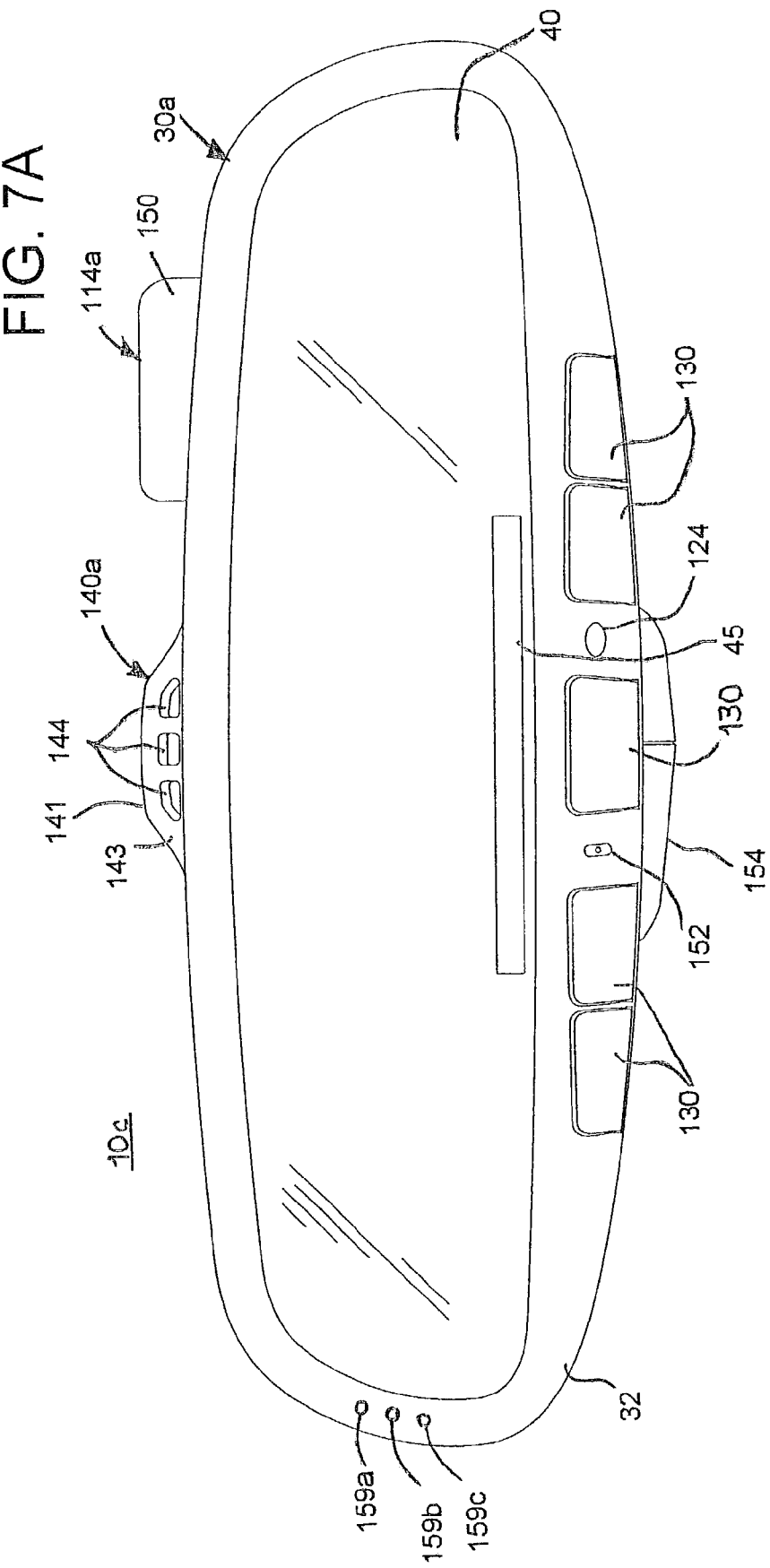

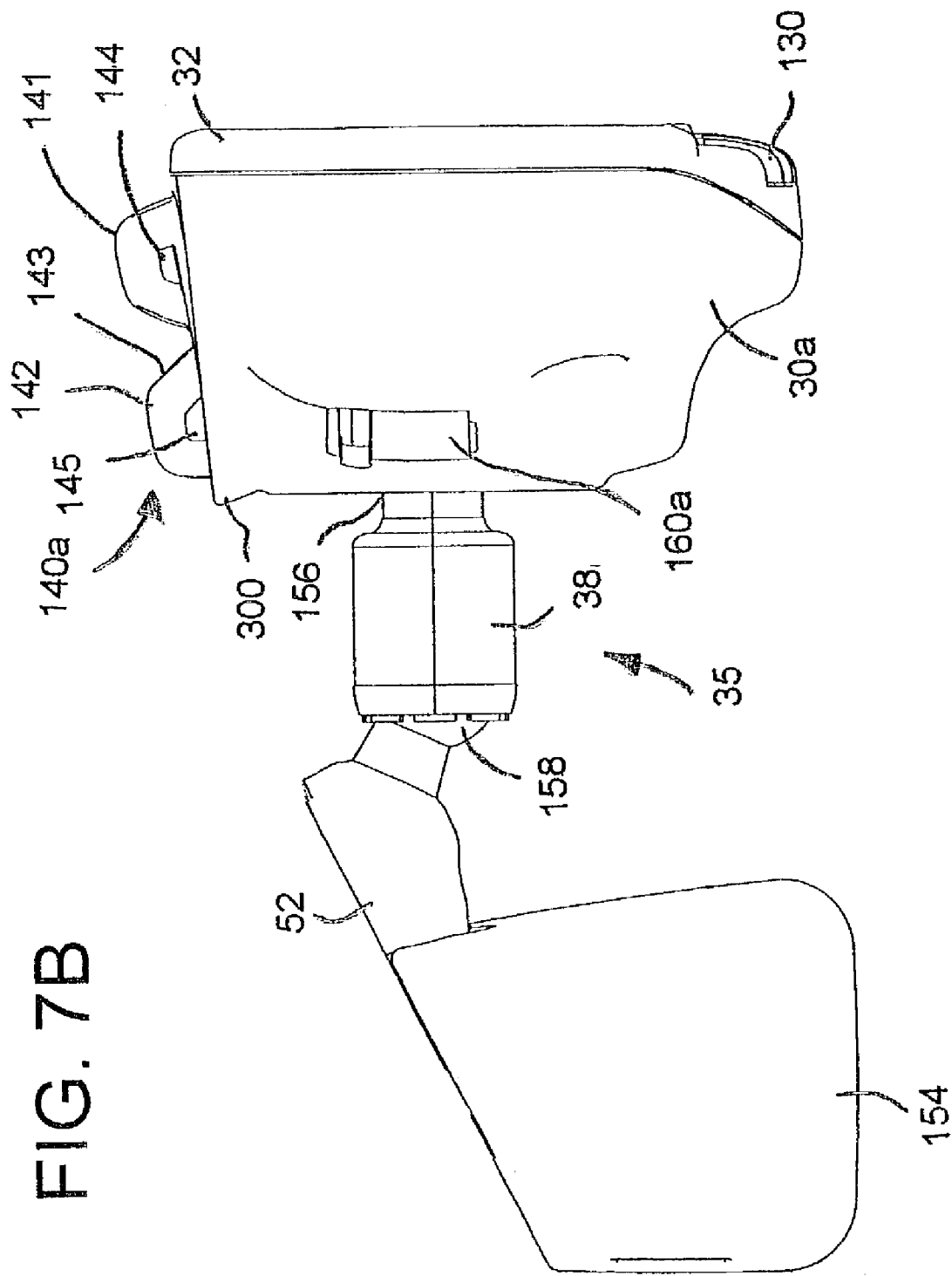

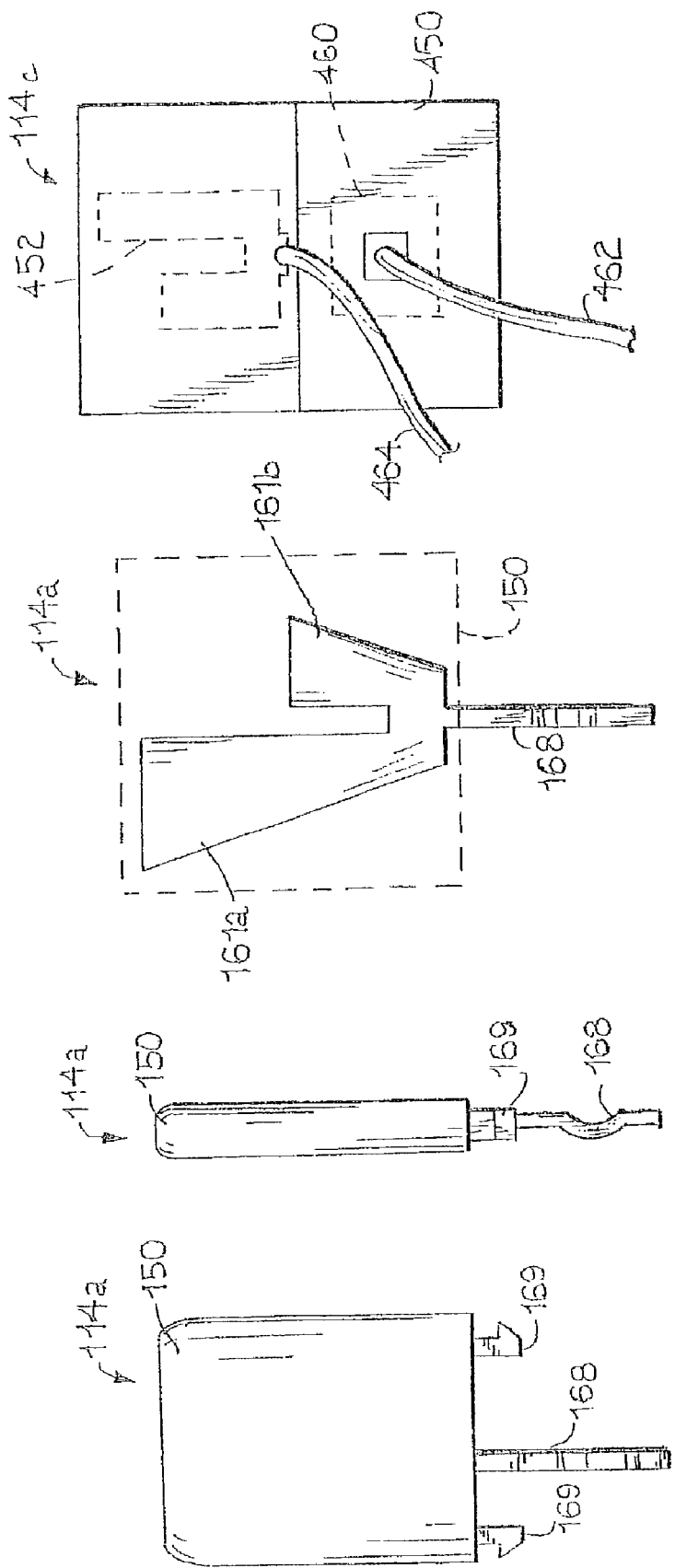

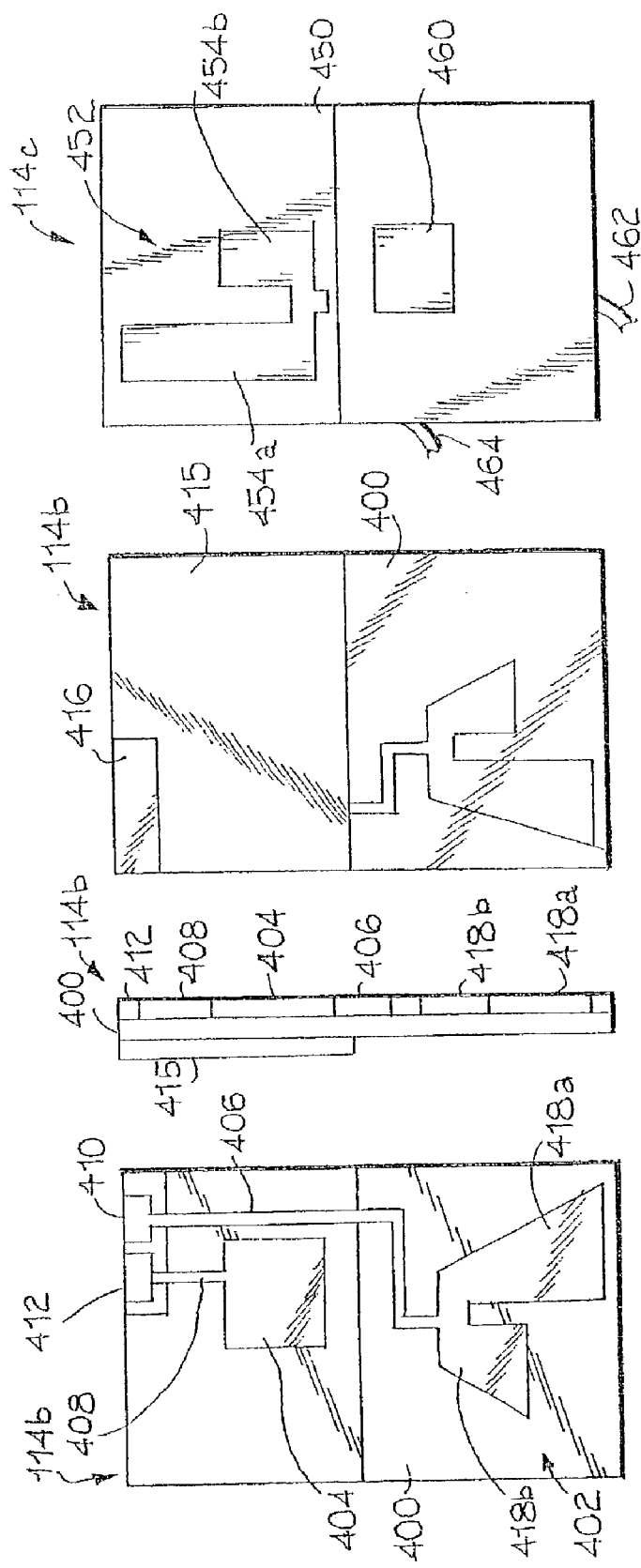

VEHICLE REARVIEW ASSEMBLY INCORPORATING A TRI-BAND ANTENNA MODULE

CROSS-REFERENCE TO RELATED APPLICATIONS

This application is related to U.S. patent application Ser. No. 09/827,304, entitled VEHICLE REARVIEW MIRROR ASSEMBLY INCORPORATING A COMMUNICATION SYSTEM, filed on Apr. 5, 2001, by Robert R. Turnbull et al., which claims priority under 35 U.S.C. §119(e) on U.S. Provisional Application No. 60/242,465 entitled VEHICLE REARVIEW MIRROR ASSEMBLY INCORPORATING A COMMUNICATION SYSTEM, filed on Oct. 23, 2000, by Robert R. Turnbull et al.; U.S. Provisional Application No. 60/216,297 entitled VEHICLE REARVIEW MIRROR ASSEMBLY INCORPORATING A COMMUNICATION SYSTEM, filed on Jul. 6, 2000, by Robert R. Turnbull et al.; and to U.S. Provisional Application No. 60/195,509 entitled VEHICLE REARVIEW MIRROR ASSEMBLY INCORPORATING A COMMUNICATION SYSTEM, filed on Apr. 6, 2000, by Robert R. Turnbull et al., the entire disclosures of which are incorporated herein by reference.

This application is also related to commonly assigned U.S. patent application Ser. No. 09/444,176 entitled VEHICLE ACCESSORY MICROPHONE, filed on Nov. 19, 1999, by Robert R. Turnbull et al.; commonly assigned U.S. patent application Ser. No. 09/724,119 entitled VEHICLE ACCESSORY MICROPHONE, filed on Nov. 28, 2000, by Robert R. Turnbull et al.; and to commonly assigned U.S. Pat. No. 6,166,698 entitled REARVIEW MIRROR WITH INTEGRATED MICROWAVE RECEIVER, filed on Feb. 16, 1999, by Robert R. Turnbull et al., the entire disclosures of which are also incorporated herein by reference.

BACKGROUND OF THE INVENTION

The present invention generally relates to a rearview assembly and, more specifically a rearview assembly that includes a tri-band antenna module.

Vehicle communication and control systems are commercially available that provide a wide variety of communication and control functions. An example of such a system is the ONSTAR® system from General Motors Corporation. Another example of such a system is disclosed in U.S. Pat. No. 6,028,537. Each of these systems includes a cellular telephone, a vehicle position identification system (specifically GPS), a processor, and a connection to the vehicle bus. These interconnected elements not only provide for conventional hands-free telephone operation, but also enable a number of other communication operations and remote vehicle control functions. For example, such a system may automatically call 9-1-1 and transmit the vehicle location (as provided by the GPS) when the vehicle air bags inflate, enable a driver to request roadside assistance or ask for navigational directions at the touch of a button. These systems also enable remote control of vehicle functions such as remote door locking or unlocking and reprogramming/personalization of vehicle accessories. Additionally, such systems may provide for remote diagnostics of the vehicle. The systems may also allow for transmittal and reception of text/paging messages and enable the vehicle to be tracked by the owner or the police.

The ONSTAR® system has been implemented by providing an electronic module, also known and referred to as a "brick," which incorporates most of the system electronics including the GPS receiver, the telephone circuitry, and essentially all the electrical components for the system (except for the antenna) in the vehicle trunk or under or behind the seats. The GPS microwave antenna is mounted elsewhere in the vehicle and connected to the brick by a coaxial cable. The cellular telephone antenna is typically mounted on a side window of the vehicle and is connected to the telephone receiver by a coaxial cable. The user interface, which includes a speaker, microphone, and push-buttons, is mounted near the driver and hardwired to the brick. Additionally, the brick must be wired to the vehicle battery and/or ignition. These types of systems may also be connected to the vehicle bus (CAN, J1850, etc.), the door locks, the air bags, the vehicle radio, to any RS232, RS-422 or other serial communication ports, and to any diagnostic circuits. All this wiring makes the system difficult and expensive to implement. When offered as a dealer-installed option, the wiring complexity of the ONSTAR® system becomes even more of a problem.

Despite all the research that has been conducted and all the literature that has been generated relating to the use of position identification systems (e.g., GPS) in vehicular applications, little consideration had been given to the practicalities of where to mount the microwave antenna that is to receive the microwave signals from the satellites. The ONSTAR® system has the microwave antenna mounted behind the front windshield just beneath the headliner or on the rear deck proximate the rear windshield. This antenna mounting is described in U.S. Pat. No. 5,959,581. Installing the antenna in this position is difficult. Published International Application No. WO 97/21127 discloses the mounting of two separate microwave antennas in the two external rearview mirror housings of the vehicle. While there are two microwave antennas located in the external rearview mirror housings, the system receiver circuit is located in the interior of the vehicle. The separation of the receiver circuit from the antennas introduces significant manufacturing difficulties. Coaxial cable typically used to connect the antenna to the receiver is expensive and difficult to handle in a manufacturing process, since it cannot be kinked and is relatively difficult to terminate. Furthermore, such coaxial cable typically has relatively expensive push-on or screw-on type connectors that connect it to the system receiver circuit and/or microwave antenna. Additionally, vehicle manufacturers have expressed an unwillingness to require their assembly line workers to connect the components using such a coaxial connector.

While WO 97/21127 further suggests that the antenna could additionally be positioned within an interior mirror of the vehicle, doing so has not been preferred because the interior mirror is movable with respect to the passenger compartment, which may introduce error in the vehicle position measurements. Also, it is better to manufacture because it puts all the electronics in one housing and is more cost effective. However, it does not work as well. In general, GPS is a line of sight system. The more sky the antenna can "see," the better the system will perform. Having the antenna mounted to the channel mount by the glass allows better visibility of the sky and hence performance. Also, it is desirable to reduce the variability inherent in the design. Having an antenna and its radiation pattern changing as different people get in the car and adjust the mirror is extremely undesirable. Further, WO 97/21127 additionally states that metallic coatings on the vehicle windshield may interfere with the operation of a receiving antenna when mounted in an interior rearview mirror assembly. Additionally, like the configuration where the receiving antennas are mounted in the two exterior mirrors, the mounting of the receiving antenna in the interior rearview mirror housing also presents manufacturing problems associated with connecting the antenna with the receiver, which apparently is mounted in the vehicle instrument panel. In the ONSTAR® system, the GPS receiver is mounted in the brick which, in turn, is mounted in the vehicle trunk or under or behind one of the seats.

As noted above, it is very difficult to install a vehicle communication and control system in a vehicle. Furthermore, the next vehicle model this system is added to is likely to require a different installation. Tooling of parts for the vehicle may have to be modified to hold the brick and the antennas. Space has to be allowed for all the wiring between the user interface, the vehicle, the audio system, the GPS antenna, the cellular antenna, and the brick. Each car may require a slightly different installation and have tooling modified and extra parts tooled to accommodate the system being added.

There exists the need for a tri-band antenna module of reduced size that can be readily incorporated within a vehicle communication and control system and may be more readily installed in a vehicle.

SUMMARY OF THE INVENTION

According to an embodiment of the present invention, a rearview assembly includes a mounting structure and a tri-band antenna module. The mounting structure is adapted for mounting to a conductive mounting button that is attached to an inside surface of a vehicle windshield. The tri-band antenna module is mounted adjacent the conductive mounting button and includes a patch antenna and a dual-band cellular antenna.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 7A is an elevational view of the front of a rearview mirror assembly constructed in accordance with another embodiment of the present invention;

FIG. 7B is a side elevational view of the side of the rearview mirror shown in FIG. 7A;

FIG. 8A is an elevational view showing the front of an antenna structure that may be used in the inventive rearview mirror assembly;

FIG. 8B is a side elevational view of the antenna structure shown in FIG. 8A;

FIG. 8C is a front elevational view showing the internal antenna structures contained within the internal antennas shown in the antenna structure of FIGS. 8A and 8B;

FIG. 8D is a front perspective view of an antenna structure constructed in accordance with another embodiment of the present invention;

FIG. 8E is a side perspective view of the antenna structure shown in FIG. 8D;

FIG. 8F is a perspective view showing the rear surface of the antenna structure shown in FIGS. 8D and 8E;

FIG. 8G is a perspective view showing the front of an antenna structure constructed in accordance with another embodiment of the present invention;

FIG. 8H is a perspective view showing the rear of the antenna structure shown in FIG. 8G;

DETAILED DESCRIPTION OF THE PREFERRED EMBODIMENTS

Figure 1:
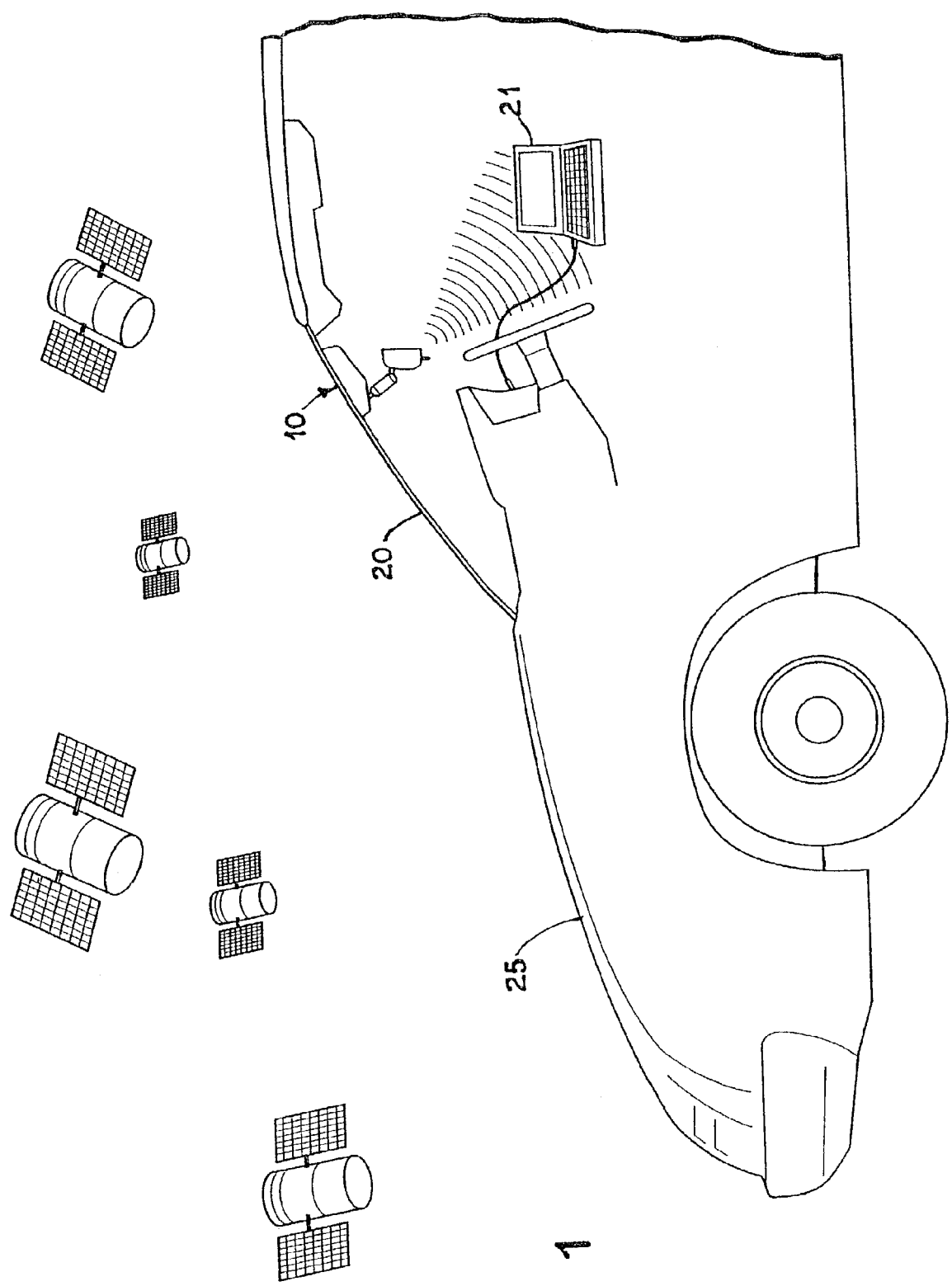
FIG. 1 is a cut-away perspective view of a vehicle in which a rearview mirror assembly is mounted.

Reference will now be made in detail to the various embodiments of the invention, examples of which are illustrated in the accompanying drawings. Wherever possible, the same reference numerals will be used throughout the drawings to refer to the same or like parts.

As noted above, the present invention pertains to a vehicle rearview assembly that incorporates some or all of the components of a vehicle communication and control system. As used herein, a "rearview assembly" is a structure that provides an image of a scene to the rear of driver. As commonly implemented, such rearview assemblies include an appropriately positioned mirror. A rearview assembly may additionally or alternatively include an electronic display that displays an image as sensed by a camera or other image sensor (see, for example, U.S. patent application Ser. No. 09/153,654 entitled SYSTEMS AND COMPONENTS FOR ENHANCING REAR VISION FROM A VEHICLE, filed on Sep. 15, 1998, by Frederick T. Bauer et al., the entire disclosure of which is incorporated herein by reference). As will be apparent to those skilled in the art, certain aspects of the present invention may be implemented in vehicle accessories other than a rearview assembly, such as an overhead console, a visor, an A-pillar trim panel, an instrument panel, etc. With respect to those implementations, the discussion below relating to rearview mirror assemblies is provided for purposes of example without otherwise limiting the scope of the invention to such rearview assemblies.

In some of the embodiments described below, the "brick" of such communication and control systems is integrated into a rearview assembly. Preferably, the GPS receiver and microwave antenna, as well as the cellular telephone antenna, are mounted to the rearview assembly. By integrating all of these components into the rearview assembly, the need for running extensive wiring through the vehicle is essentially eliminated. Furthermore, the whole system may be readily installed as a vehicle option by the vehicle manufacturer, the dealer, or anyone buying/selling the product as an after-market product. Other advantages of the invention are described further below.

Rearview Assembly Construction

An example of an inside rearview mirror assembly constructed in accordance with one embodiment of the present invention is shown in FIGS. 1–6. FIG. 1 shows the general mounting of rearview mirror assembly 10 to the inside surface of a front windshield 20 of a vehicle 25. FIGS. 2A and 2B show two different exemplary rearview mirror assembly constructions in which the microwave antenna may be mounted. More specifically, rearview mirror assembly 10a shown in FIG. 2A is designed to be mounted directly to windshield 20, whereas rearview mirror assembly 10b shown in FIG. 2B is mounted to the roof of the vehicle.

Figure 2A:
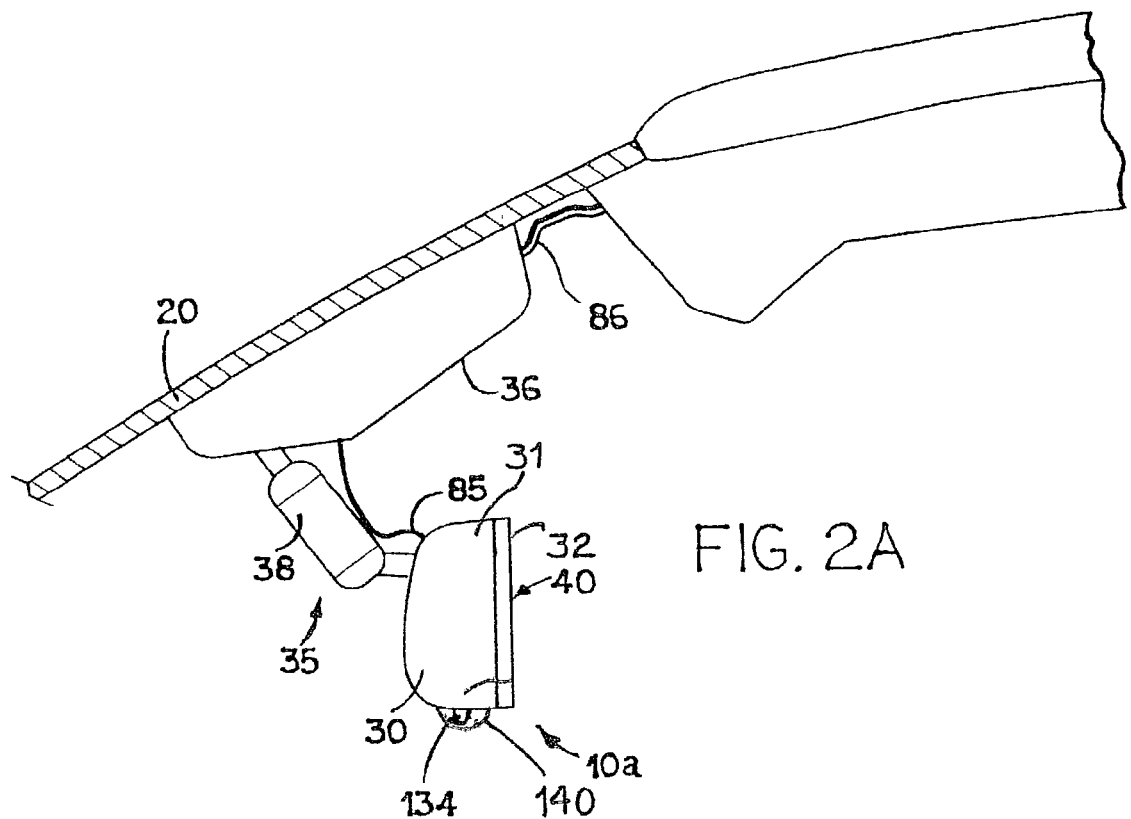
FIG. 2A is a perspective side view of a rearview mirror assembly.
Figure 2B:
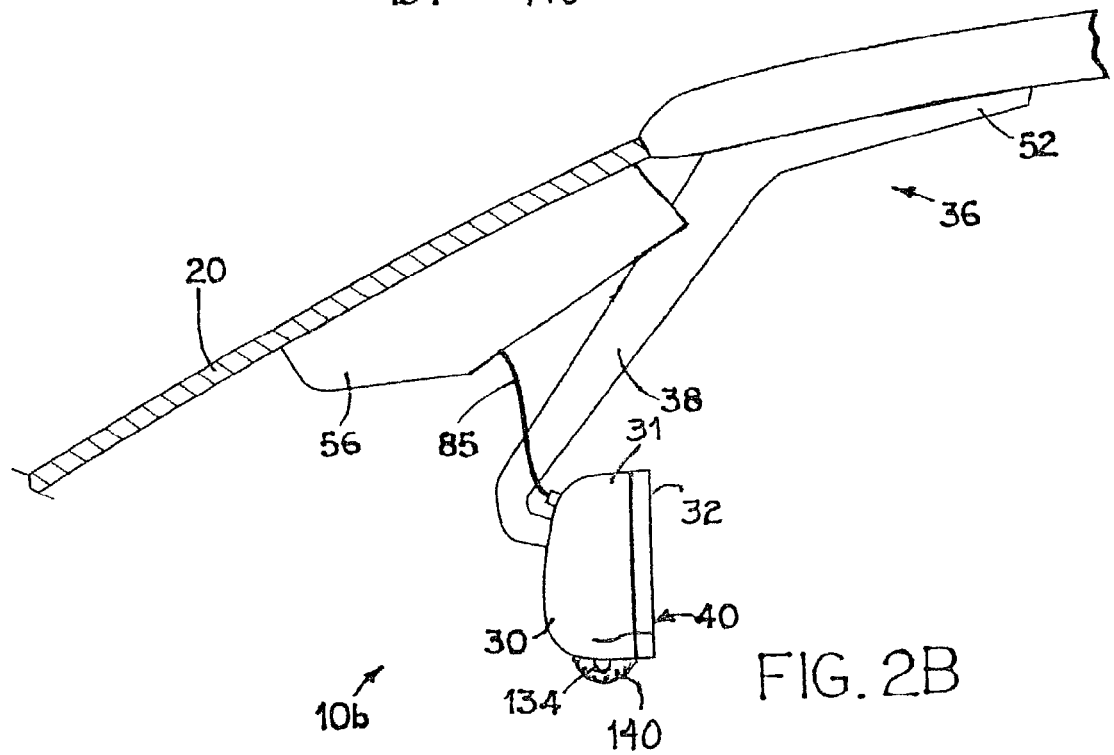
FIG. 2B is a perspective side view of another rearview mirror assembly.
Figure 6:
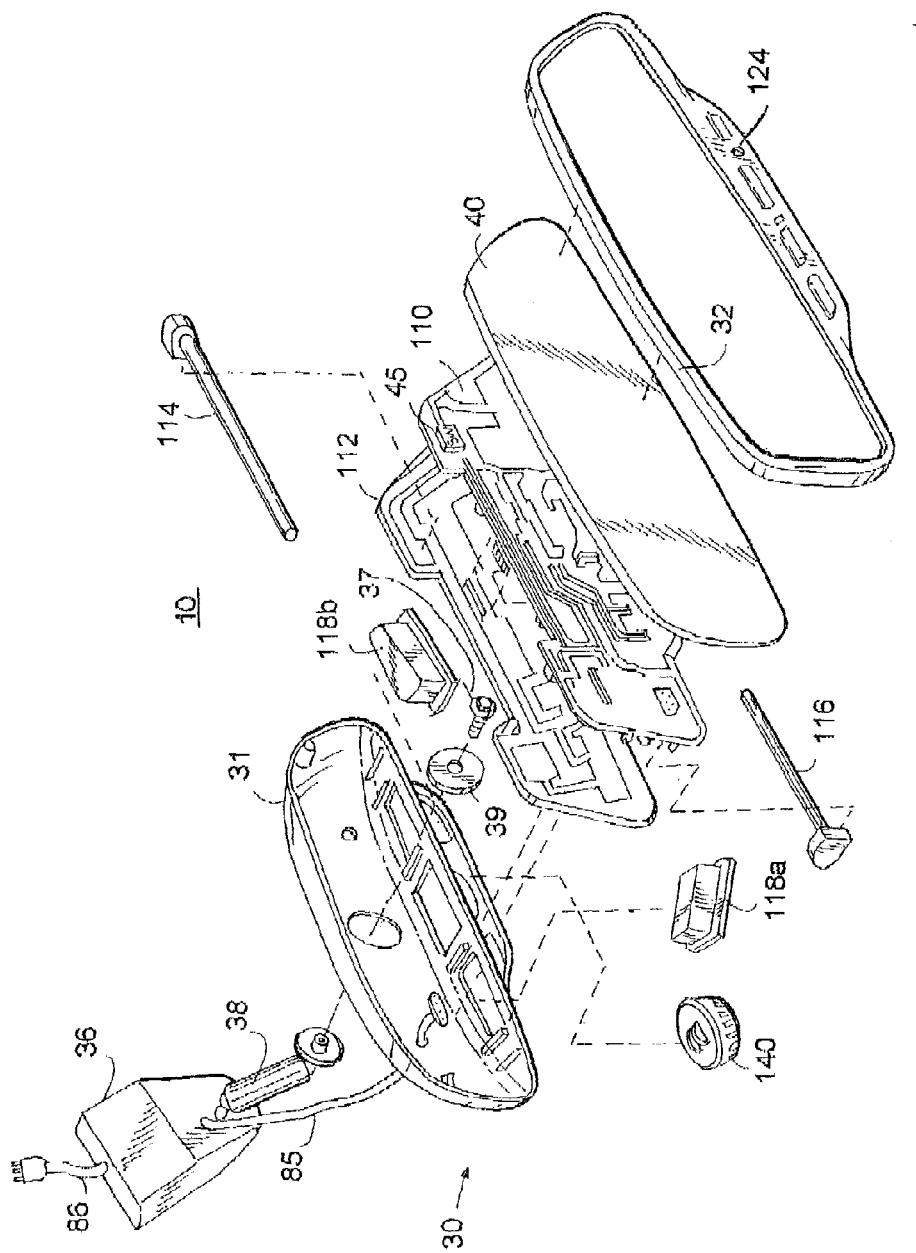
FIG. 6 is a partially exploded perspective view of a rearview mirror assembly according to an embodiment of the present invention.

In general, rearview mirror assemblies include a mirror housing 30 that may have a wide variety of possible designs, such as, for example, the mirror housing taught and claimed in U.S. Pat. No. 5,448,397. Rearview mirror assemblies also include a mirror 40 (FIG. 5) mounted in mirror housing 30, and may include a mounting bracket 35 that attaches the mirror housing 30 to the vehicle. Such mounting brackets typically include a mounting foot 36 that is directly mounted to the vehicle and to a mirror stem 38 that extends between mounting foot 36 and mirror housing 30. As apparent from a comparison of FIGS. 2A and 2B, the structure of mounting foot 36 and mirror stem 38 may vary considerably from one rearview mirror assembly to the next. For example, mirror stem 38 may be pivotally mounted to mounting foot 36 as shown in FIG. 2A or fixedly attached to mounting foot 36 as shown in FIG. 2B. Additionally, mirror housing 30 is typically pivotally attached to mirror stem 38. Such pivotal attachments allow the driver to move and position the mirror so as to allow the driver to a have a clear field of view towards the rear of the vehicle. The disclosed rearview mirror assembly also preferably includes a display 45 (FIG. 5) housed within mirror housing 30 or housed within mounting foot 36. As shown in FIGS. 2A, 2B and 6, mirror housing 30 may include a mirror housing body 31 and a bezel 32 that is mounted to mirror housing body 31 so as to secure mirror 40 and all the components in mirror housing 30.

FIG. 6 shows an exemplary mechanical construction of mirror housing 30 of rearview mirror assembly 10. As illustrated, the following components are mounted in or on mirror housing 30: a mirror element 40; a first printed circuit board 110; a second printed circuit board 112; a first RF antenna 114; a second RF antenna 116; and first and second map lamps 118a and 118b. A microphone assembly 140 may be mounted to the bottom or top of mirror housing 30. As shown, mirror housing 30 is secured to mirror stem 38 by means of a bolt 37 and a washer 39. It will be appreciated, however, that any suitable means may be utilized to mount mirror housing 30 to mirror stem 38.

Although antennas 114 and 116 are shown as being oriented horizontally and having a generally linear shape (as would be true if the antennas were strip antennas), those skilled in the art will appreciate that these RF antennas may be helical or take any suitable form for performing the functions that are described further below. Also, either one or both of antennas 114 and 116 may be mounted to the exterior of the rearview mirror assembly.

A rearview mirror assembly 10c constructed in accordance with one embodiment is shown in FIGS. 7A–7D. Like the mirror assembly shown in the previous embodiment, rearview mirror assembly 10c includes a mirror housing 30a and a mirror 40, which is preferably an electrochromic mirror. Assembly 10c further includes a display 45, a forward bezel portion 32 of housing 30a, a plurality of user pushbuttons 130, and a glare sensor 124. Rearview mirror assembly 10c further includes a microphone assembly 140a, an antenna structure 114a, an LED indicator 152, and an optional camera housing 154. Camera housing 154 is provided for housing an image sensor array for automatically controlling the beam pattern of the vehicle's exterior lights (i.e., low beam headlamps, high beam headlamps, daytime running lights, fog lights, etc.). A more detailed description of such a subassembly and the manner in which it is mechanically attached to a rearview mirror assembly is provided in commonly assigned U.S. patent application Ser. No. 09/800,460 (unofficial) filed on Mar. 5, 2001, by Joseph S. Stam et al. entitled SYSTEM FOR CONTROLLING EXTERIOR VEHICLE LIGHTS, the entire disclosure of which is incorporated herein by reference.

Figure 7C:
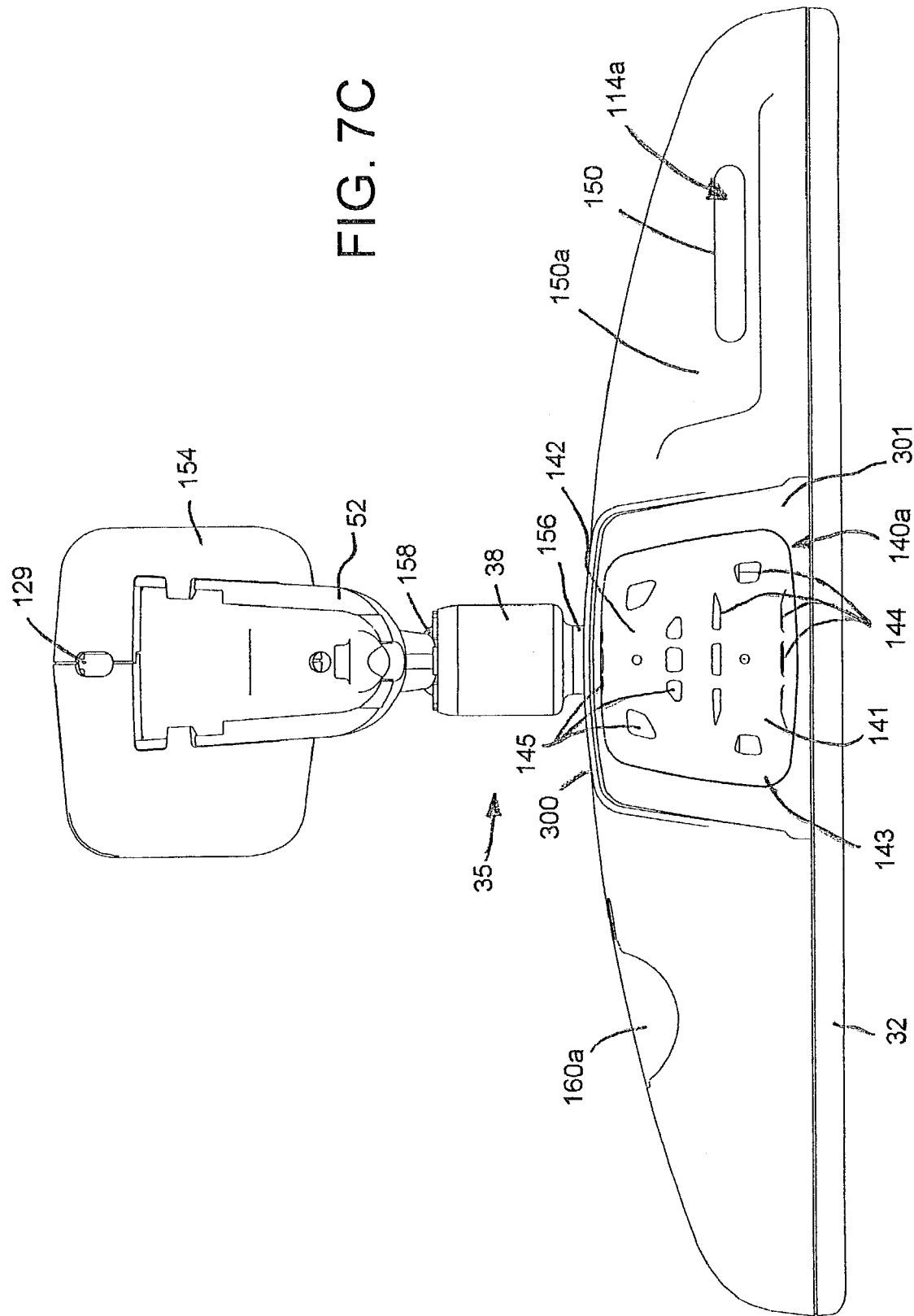
FIG. 7C is a top plan view showing the top of the rearview mirror assembly of FIGS. 7A and 7B.
Figure 7D:
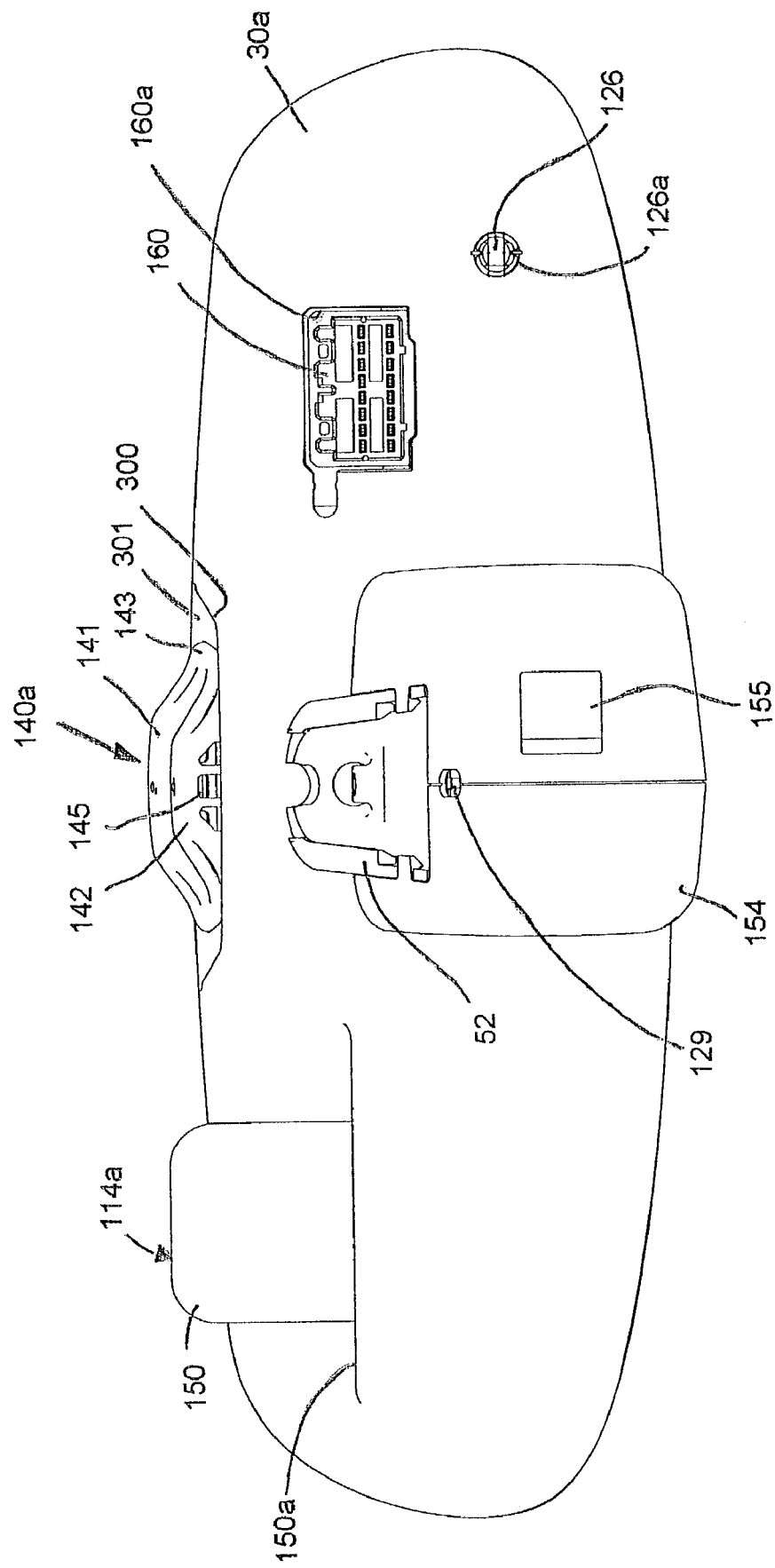
FIG. 7D is an elevational view showing the rear of the rearview mirror assembly shown in FIGS. 7A–7C.

As best shown in FIGS. 7B and 7D, camera housing 154 includes an opening for a sky sensor 129, which senses the ambient light level of the sky above and slightly forward of the vehicle. Additionally, a window 155 is provided through which the camera receives the light from the forward scene to be imaged. As described in more detail in the above-referenced patent application, camera housing 154 is secured to a mounting foot 52 of a mounting bracket 35. Mounting foot 52 includes a first rotary ball joint 158 that extends rearward from a surface of foot 52 opposite from the vehicle windshield. Ball 158 is received in a corresponding socket of a stem 38, which in turn includes a second rotary ball joint 156, which is received by a hub provided within mirror housing 30a.

As described in further detail below, a top middle portion of mirror housing 30a is substantially flat to provide a flat surface 301 upon which microphone subassembly 140a may be mounted. A rearward rim of surface 301 includes an air deflector 300 as also described further below.

Referring back to FIGS. 7A, 7C, and 7D, an antenna structure 114a may be mounted so as to extend upward from a rear portion of mirror housing 30a. A relatively flat surface 150a may be formed in a portion of the rear of housing 30a for receiving antenna structure 114a. One construction for antenna structure 114a is described below with reference to FIGS. 8A–8C.

As best shown in FIGS. 7C and 7D, housing 30a includes an aperture 160a through which a connector receptacle 160 is accessible. An additional aperture 126a is formed in housing 30a to allow light to strike an ambient light sensor 126, which is discussed further below.

FIGS. 8A–8C illustrate an antenna structure 114a that may be used as the antenna for the cellular telephone contained within the mirror housing. As illustrated, antenna structure 114a preferably includes two antenna portions 161a and 161b that are shaped as quarter wave strips resembling inverted triangles or wedges so as to function as a broadband antenna. Antenna portions 161a and 161b may also be fractal. Specifically, first antenna portion 161a is configured to be tuned to frequencies of approximately 800 MHz while antenna portion 161b is configured to be tuned to frequencies of approximately 1.9 GHz, which correspond to signals from PCS devices. Antenna portions 161a and 161b are preferably encapsulated in a plastic antenna housing 150, which is preferably made of the same or like materials as housing shell 30a so as to provide a similar and aesthetically pleasing appearance. Antenna housing 150 is preferably molded to include at least two resilient tabs 169 that allow the antenna structure 114a to be snapped in place in a corresponding aperture formed in mirror housing 30a. One or more leads 168 extends downward from antenna housing 150 from antenna portions 161a and 161b for engagement with a contact in a receptacle plug provided on one of the first or second circuit boards 110 and 112 provided in housing 30a. Such a construction may eliminate the need for a coaxial cable connection. With the antenna construction shown in FIGS. 8A–8C, the mirror housing is coated with a metallic coating so as to serve as the ground plane for the antenna. In addition to providing an antenna for the internal telephone provided within housing 30a, an additional antenna may be provided in housing 150 to allow reception of Bluetooth™ signals.

Antenna structure 114a may be mounted in other locations of the rearview mirror assembly or may be mounted elsewhere in the vehicle. For example, the antenna may be configured as a transparent antenna and integrated in a structure with the GPS antenna in a manner similar to that illustrated in FIGS. 8D, 8E, and 8F. Specifically, the transparent structure includes a transparent substrate 400 preferably made of a transparent polymer, a dual-band antenna structure 402 having dimensions and structure similar to that shown in FIG. 8C, a GPS patch antenna 404, lead lines 406 and 408, and contact terminals 410 and 412. Dual-band cellular antenna 402, GPS antenna 404, lead lines 406 and 408, and contact terminals 412 and 410 are preferably formed on a first surface of substrate 400 and are formed of an electrically conductive material. The electrically conductive material may be provided on substrate 400 by selectively metallizing the regions of the first surface of substrate 400 in those regions defining the antennas, leads, and contact terminals. "Metallizing" should be understood to include application of transparent conductive coatings such as Indium Tin Oxide (ITO). Very thin, nearly transparent layers of metal such as gold may also be used. One suitable substrate material is polymethylpentene, also known as TPX. A low loss material, such as TPX, is desirable to construct an efficient GPS patch antenna. Other antenna structures, such as monopoles, which do not form high Q resonant cavities (as is the case for a patch antenna), may be constructed using higher loss materials such as polyester (Mylar). The antenna system may also be a hybrid system where part of the antenna or ground plane is opaque. As shown in FIGS. 10E and 10F, the opposite surface of substrate 400 may also be coated with an electrically conductive material to provide a ground plane 415. The transparent substrate 400 may serve as a dielectric layer between patch antenna 404 and ground plane 415 or an optional dielectric layer may be formed between patch antenna 404 and substrate 400. A small region 416 underlying contact terminal pads 410 and 412 may be left devoid of the ground plane conductive material 415 so as to provide for ease of connection of respective coaxial cables or other connection means.

Dual-band cellular antenna 402 may be configured in any shape or fashion and is generally shown as having a similar broadband structure including two wedge-shaped micro strips 418a and 418b. As noted above, any one or all of the conductive components may be transparent or opaque and used in combination on a common substrate. The construction shown in FIGS. 8D–8F is preferred in that it allows dual-band cellular antenna 402 and GPS patch antenna 404 to share a common ground plane 415. It will be appreciated, however, that the two antennas may be provided on separate substrates or otherwise totally separated from one another with one being an opaque and different structure similar to those disclosed above while the other may be transparent. Any of the above antennas may incorporate a transparent micro strip transmission line for connection to the receiver. The micro strip transmission line may be terminated to double-sided, low or zero insertion force connectors such as an AVX Series 8370 connector.

By utilizing the transparent antenna system disclosed in FIGS. 8D–8F, the antenna system can cover a larger area of the windshield than an opaque antenna system without becoming objectionable. A larger transparent antenna may have better performance than an opaque system whose size is constrained by aesthetic rather than engineering considerations. The transparent antenna system can be easily installed in an after-market application and may offer cost advantages over a system integrated in the windshield.

An alternative antenna construction 114c is illustrated in FIGS. 8G and 8H. This construction is similar to that shown in FIGS. 8D–8F, however, the structure is not formed on a transparent substrate. More specifically, the structure is formed on a dielectric substrate 450. The antenna structure includes a dual-band cellular antenna 452 including two straight micro strips 454a and 454b provided on a first side of substrate 450. A ground plane is provided on either side of a portion of substrate 450. A GPS patch antenna 460 is provided on an opposite surface of substrate 450 than ground plane 456. A pair of coax connectors 462 and 464 are connected to the respective antennas. Resistors and other circuit components may be formed on this structure as may be desired. The telephone antenna may have any shape or configuration including a planar, inverted "F" antenna (PIFA).

Microwave Antenna

Figure 3:
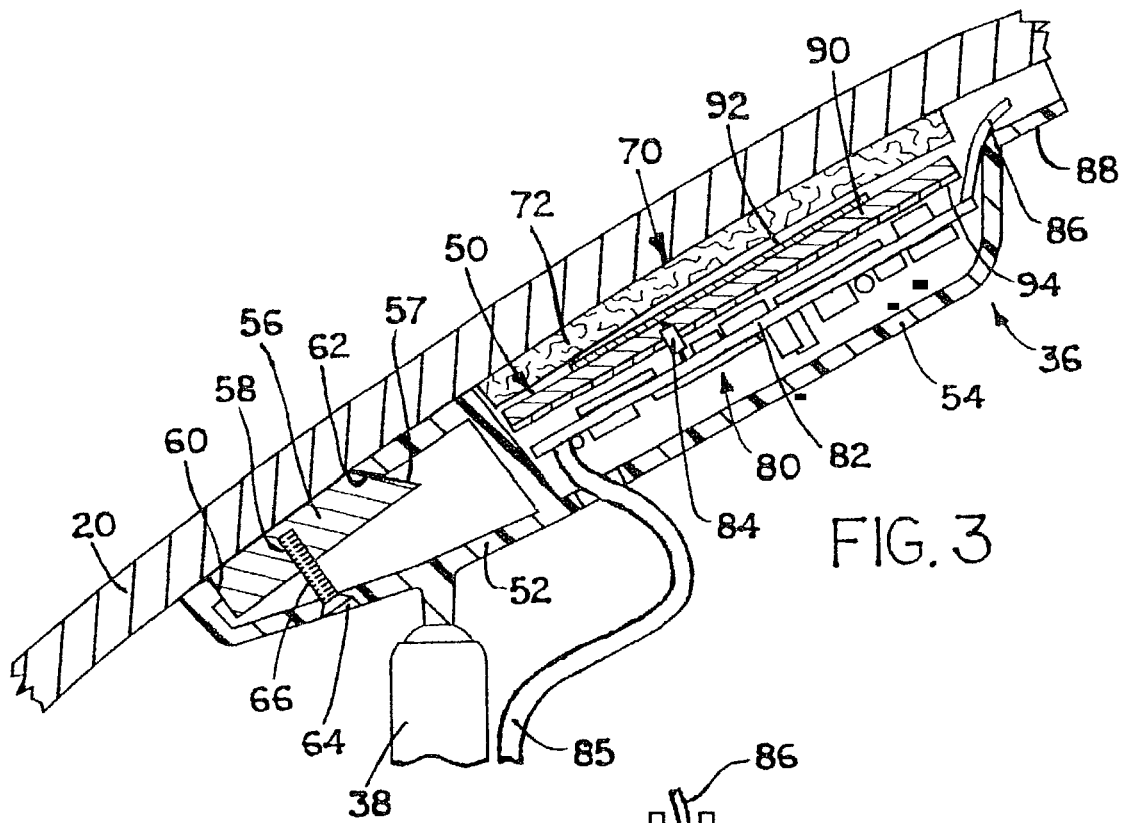
FIG. 3 is a cross-sectional view of the mounting foot of a rearview mirror assembly.
Figure 4:
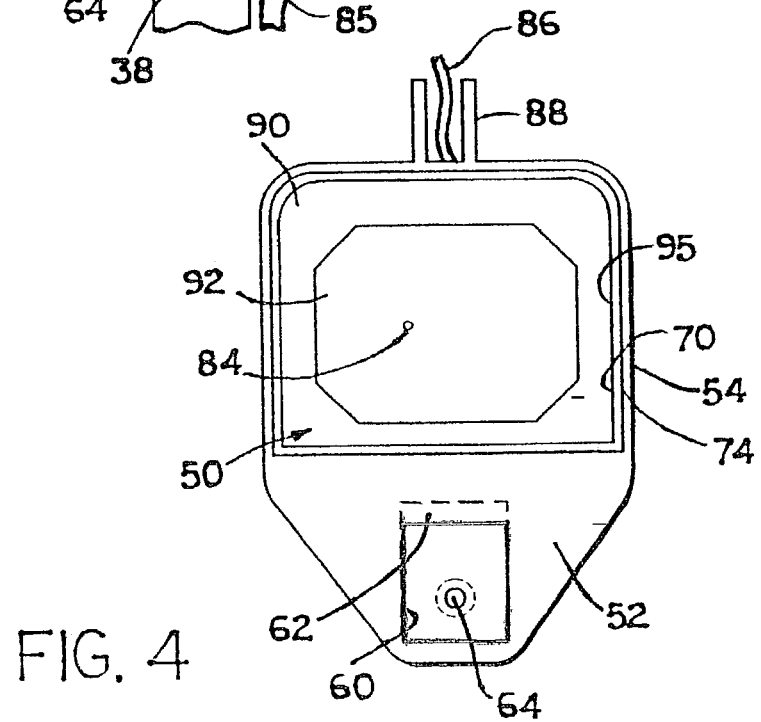
FIG. 4 is a perspective view of the forward-facing portion of the mounting foot of the rearview mirror assembly shown in FIG. 3.
Figure 5:
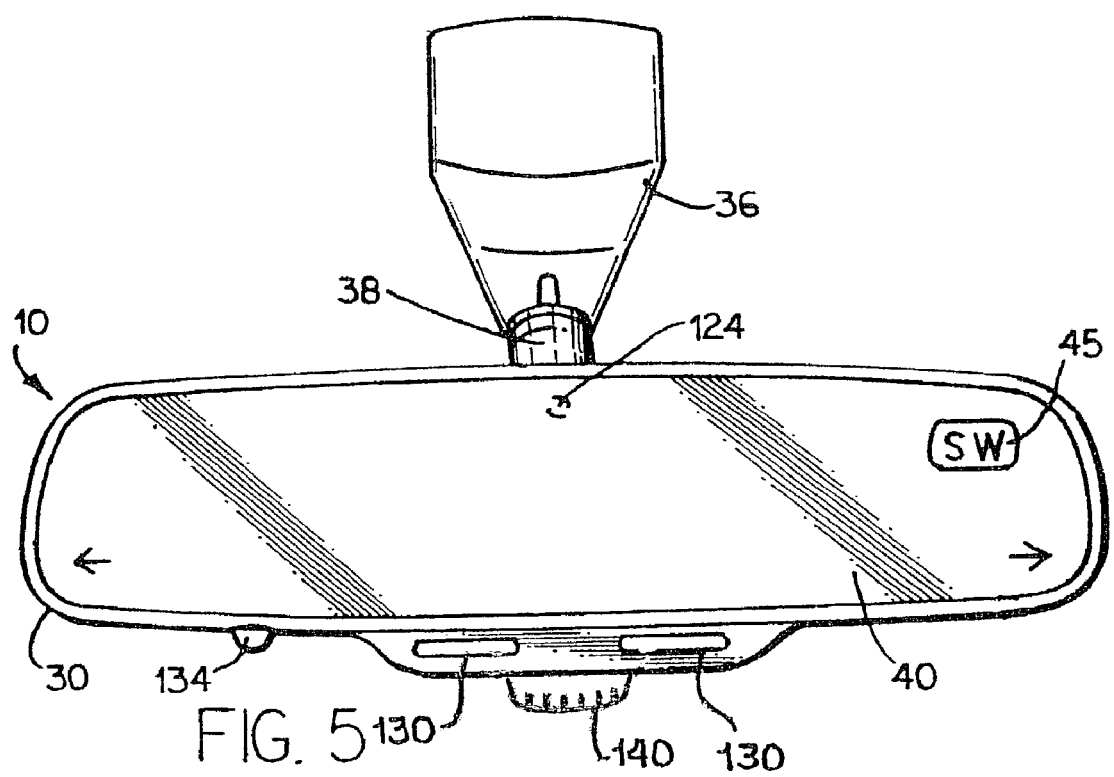
FIG. 5 is a rearward perspective view of the rearview mirror assembly shown in FIG. 2A.

As shown in FIGS. 3 and 4, a microwave antenna 50 is preferably mounted within mounting foot 36 of mounting bracket 35 of rearview mirror assembly 10a, 10b, 10c. As shown in FIG. 3, mounting foot 36 includes a mounting portion 52 and an antenna housing portion 54. The structure of mounting portion 52 is shown as being configured to attach to a mounting puck or button 56 that is attached to the inside surface of windshield 20 using an adhesive. Puck 56 includes an inclined edge surface 57 and a threaded aperture 58 formed in the surface of puck 56 opposite that which is adhered to windshield 20. Mounting portion 52 thus has an aperture 60 for engaging puck 56. One edge 62 of aperture 60 has a sloped profile so as to engage inclined edge surface 57 of puck 56. In this manner, the size of aperture 60 is slightly smaller than the area of the surface of puck 56 that is opposite that which is secured to windshield 20. To then secure mounting portion 52 to puck 56, a set screw 66 is slid into an aperture 64 formed in mounting portion 52 and turned so as to thread into threaded aperture 58 on puck 56.

Antenna housing portion 54 of mounting foot 36 may be integrally formed with mounting portion 52 or formed as a separate component that may be attached to mounting portion 52. Antenna housing portion 54 includes an aperture 70 having a generally square, rectangular, or round shape or any other shape for accommodating the particular shape of antenna 50. Aperture 70 is provided so as to open towards windshield 20 through which microwave signals from satellites may pass to reach microwave antenna 50. Antenna 50 may be mounted in aperture 70 so as to be substantially parallel to, and slightly spaced apart from, the inner surface of windshield 20. Preferably, antenna 50 is mounted horizontally in housing portion 54 and has a ground plane configured as disclosed in commonly assigned U.S. patent application Ser. No. 09/535,999, entitled MICROWAVE ANTENNA FOR USE IN A VEHICLE, filed on Mar. 28, 1999, the entire disclosure of which is incorporated herein by reference. The structure of antenna 50 is discussed further below.

As shown in FIG. 3, a foam pad 72 or other non-conductive substrate is placed within antenna housing portion 54 between antenna 50 and the inside surface of windshield 20. As shown in FIG. 4, antenna mounting portion 54 also includes a gasket 74 provided about the periphery of aperture 70, so as to provide for additional protection against moisture or debris coming between windshield 20 and antenna 50.

In addition to providing space for accommodating antenna 50, mounting foot 36 is configured to provide sufficient space for a receiver circuit 80 printed on a circuit board 82. Circuit board 82 is thus mounted directly behind antenna 50 in antenna mounting portion 54, so as to minimize the length of antenna connector 84 that extends between antenna 50 and printed circuit board 82.

Figure 11:
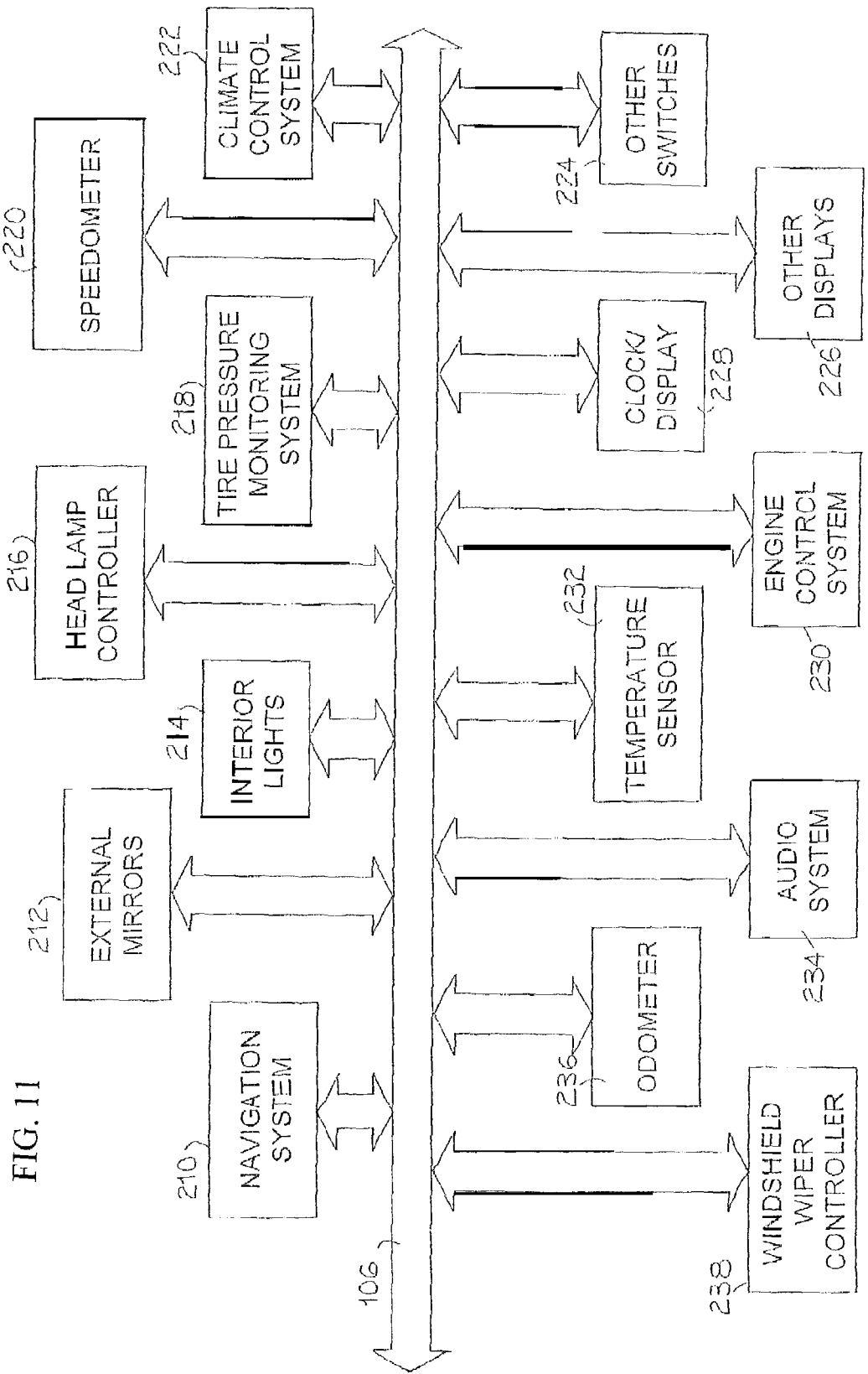
FIG. 11 is an electrical circuit diagram in block form showing various electrical systems that may be coupled to the inventive vehicle communication and control system shown in FIG. 11.

Because receiver circuit 80 converts the signals received by antenna 50 into signals that may be transmitted over conventional wires, the information obtained from the satellite signals may be transmitted to other components in the vehicle via the vehicle bus, discrete connections, an IR transmitter 134 (FIG. 11), or an RF transmitter 185 (FIG. 11). More specifically, if a display 45 or additional circuitry, such as a control circuit for an electrochromic mirror or electronic compass, is mounted in mirror housing 30, receiver circuit 80 may be coupled to such circuitry via a connector line 85 that may be run between mounting foot 36 and mirror housing 30 outside of mirror stem 38 or internally through mirror stem 38 as disclosed in U.S. Pat. No. 5,984,482. Additionally, data processed by receiver circuit 80 may be transmitted via line 86 to other electrical systems within the vehicle. Mirror assembly 10 may include a shroud 88 that extends from mounting foot 36 to the vehicle headliner, so as to provide a covert channel for running cabling 86 between rearview mirror assembly 10 and the remainder of the vehicle.

As shown in FIGS. 3 and 4, microwave antenna 50 is constructed as a patch antenna including a dielectric substrate 90 having a layer of a conductive material provided on one side of dielectric substrate 90 so as to form a resonant patch 92. Antenna 50 further includes a layer of electrically conductive material on the opposite side of dielectric substrate 90, which forms a conductive ground plane 94 for antenna 50.

By mounting microwave antenna 50 to the mounting bracket of an inside rearview mirror assembly, the antenna has a clear view through the sloped front windshield of much of the sky above and in front of the vehicle. Additionally, the front windshield of the vehicle protects the antenna from dirt, moisture, snow, and humid air that may readily reach the microwave antenna and adversely affect its performance if it is mounted in a component on the exterior of the vehicle.

In some implementations, it may be preferred to also mount the antenna for the telephone subsystem in antenna housing portion 54. By mounting both the microwave and telephone antennae in the same housing, any EMI shielding that is provided between microwave antenna 50 and the electronics in housing 30, may likewise shield the telephone antenna.

Electrical System

Figure 9:
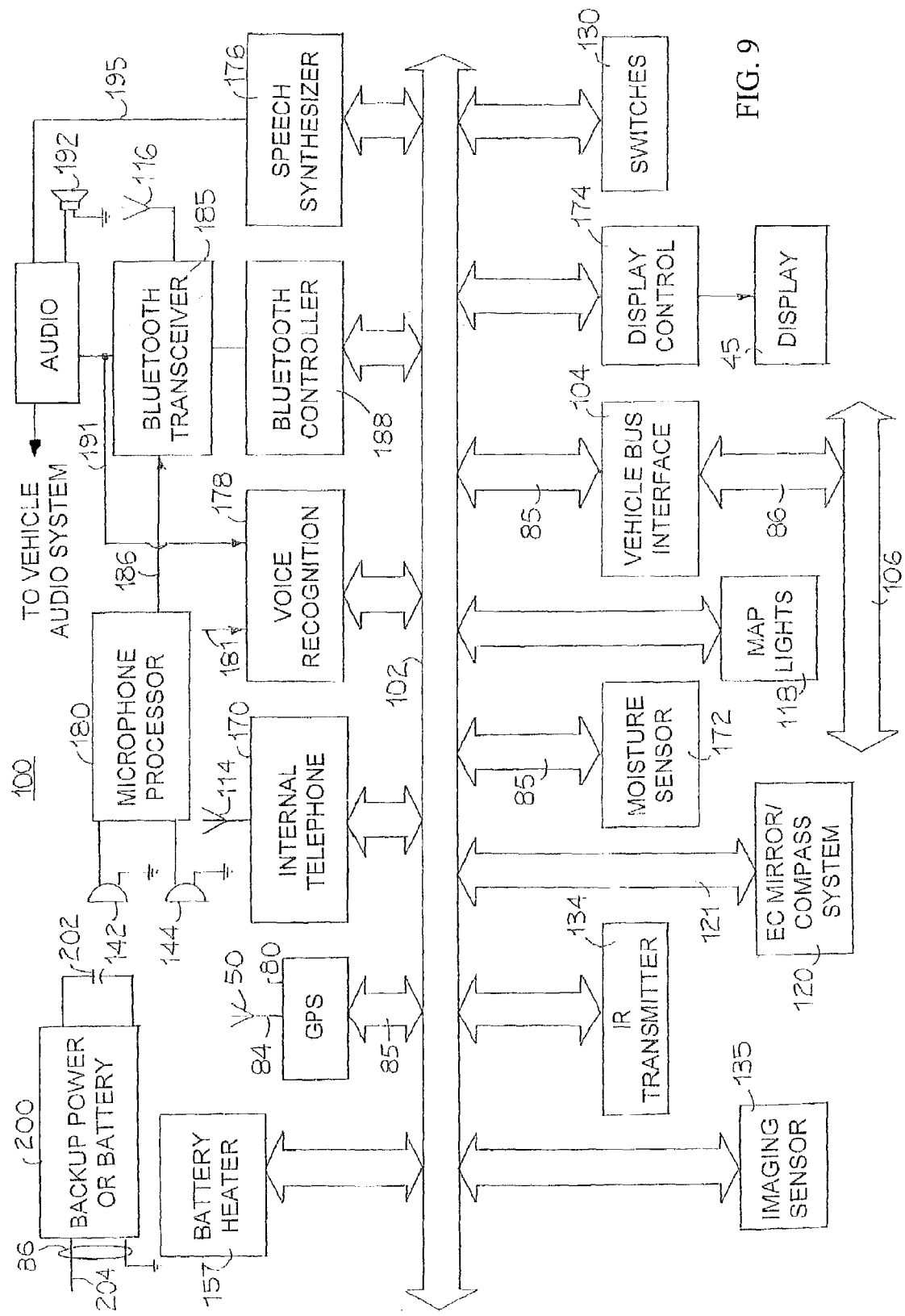
FIG. 9 is an electrical circuit diagram in block form showing an embodiment of the vehicle communication and control system of the present invention.

FIG. 9 shows the vehicle communication and control system 100 according to the present invention. As shown in FIG. 9, system 100 includes a GPS (or GLONAS) receiver 80 that is coupled to a microwave antenna 50 via an antenna connector 84. As discussed above, antenna 50 and GPS receiver 80 are preferably mounted in mounting foot 36 of rearview mirror assembly 10. GPS receiver 80 may be coupled to a local bus 102 via a cable 85, which extends between mounting foot 36 in mirror housing 30. Local bus 102 interconnects the various electrical components that are preferably provided on the first and second printed circuit boards 110 and 112 mounted within mirror housing 30. Cable 85 may also be considered as an extension of local bus 102.

Vehicle bus interface circuit 104 is preferably mounted on the same printed circuit board as GPS receiver 80 and is connected to local bus 102 via cable 85. Vehicle bus interface 104 is then connected to the vehicle bus 106 via cable 86, which extends from mounting foot 36 to a connector provided between the roof and headliner or within an overhead console. It is also possible to use an audio and data transceiver 185 in place of bus interface 104 provided that there is a corresponding compatible transceiver coupled to vehicle bus 106. Preferably, any such audio and data transceiver is a Bluetooth™ transceiver, which utilizes the Bluetooth™ standard communication protocols.

Both map lamps 118 and switches 130 may be coupled to local bus 102. Similarly, display 45 may be coupled to a display control circuit 174 which, in turn, may be coupled to local bus 102. Preferably, any map lamp(s) 118 that are provided in the assembly utilize light emitting diodes (LEDs) so as to minimize the size of the lamp subassemblies and/or reduce the heat dissipation from the lamps. Preferably, the lamps are constructed using the white-light-emitting LEDs disclosed in any one of: commonly assigned U.S. Pat. No. 5,803,579, commonly assigned U.S. patent application Ser. Nos. 09/148,375 and 09/426,795, or any of commonly assigned U.S. Patent Provisional Application Nos. 60/265,487, 60/265,489 and 60/270,054.

As described further below, internal cellular telephone 170 may be printed on circuit board 110 or 112 and connected to first RF antenna 114, which is also preferably mounted on mirror housing 30. The manner in which internal cellular telephone 170 is utilized is described in further detail below. Antenna 114 is preferably mounted on the exterior of mirror housing 30, however, those skilled in the art will appreciate that this cellular telephone antenna may likewise be mounted remotely from mirror assembly 10 or in mounting foot 36. By mounting antenna 114 on mirror housing 30, however, the vehicle communication and control system of the present invention may be confined to a single integral vehicle accessory—thereby eliminating the need for running additional wiring to a remote location and thus saving substantial materials, manufacturing, and installation costs.

Microwave antenna 50 may also be integrated with cellular antenna 114, an RF antenna for a trainable garage door opener transmitter, an RKE receiver, and/or an antenna for a satellite CD radio.

Rearview mirror assembly 10 may further include a moisture sensor 172 that may be coupled to local bus 102. Moisture sensor 172 is also preferably mounted in mounting foot 36 so as to detect the presence of moisture such as fog, rain, dew, or snow on the vehicle windshield. A preferred moisture sensor is disclosed in commonly assigned U.S. Pat. No. 5,923,027, the entire disclosure of which is incorporated herein by reference. As disclosed in U.S. Pat. No. 5,923,027, the output from moisture sensor 172 may be analyzed to control the windshield wipers and/or the window and mirror defrosters of the vehicle. Because it is preferable to mount moisture sensor 172 in mounting foot 36, moisture sensor 172 would be coupled to local bus 102 via cable 85.

Figure 12:
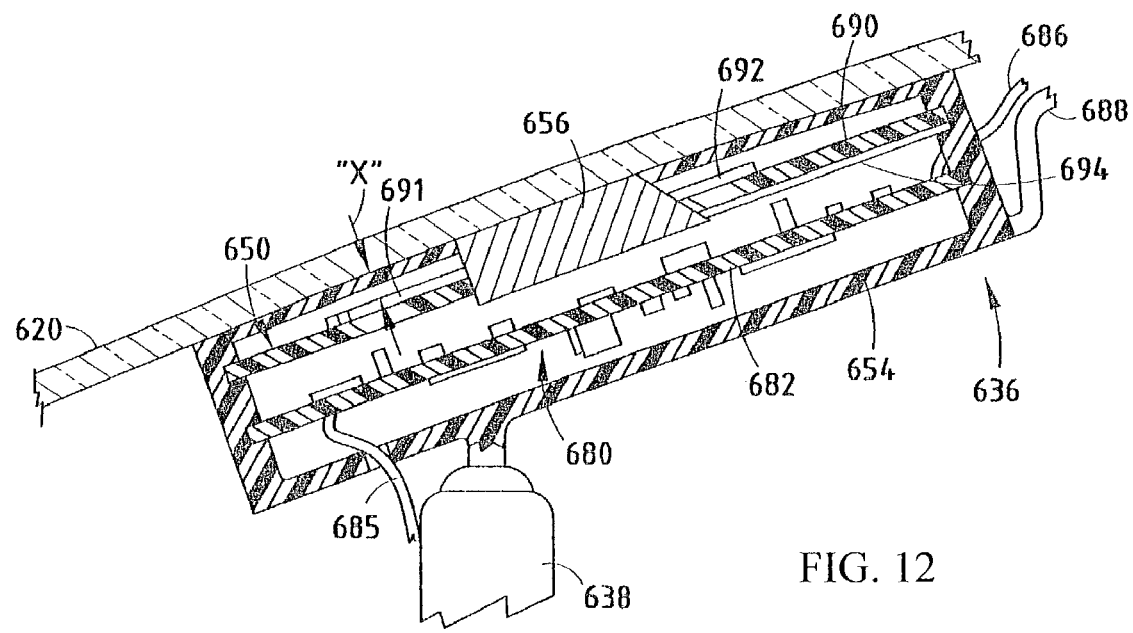
FIG. 12 is a cross-sectional view of the mounting structure of FIG. 13.

System 100 may also include an imaging sensor 135 that is utilized for purposes of controlling the vehicle headlights using headlamp controller 216 (FIG. 11). Suitable sensors and headlamp controllers are disclosed in commonly assigned U.S. Pat. No. 5,837,994; U.S. patent application Ser. No. 09/528,389 entitled IMPROVED VEHICLE LAMP CONTROLLER, filed on Mar. 20, 2000; and U.S. patent application Ser. No. 09/800,460 (unofficial) entitled SYSTEM FOR CONTROLLING EXTERIOR VEHICLE LIGHTS, filed on Mar. 5, 2001, by Joseph S. Stam et al., the entire disclosures of which are incorporated herein by reference. The imaging sensor utilizes a low resolution pixel sensor to obtain an image from the front of the vehicle to detect the presence or absence of vehicles in front of the vehicle for purposes of controlling the brightness of the vehicle headlamps. The images obtained from the low resolution pixel sensor 135 may also be stored in memory to provide a brief history of what was in front of the vehicle, which may be particularly advantageous when determining the cause of an accident. The memory in which such images are stored is preferably non-volatile memory unless suitable battery back-up power is available in which case the memory may be volatile memory. During normal operation, images from sensor 135 are stored in volatile memory on a first-in/first-out basis for processing to identify light sources. Upon detection of a crash, a control circuit of the present invention may transfer the images stored in the volatile memory to the non-volatile memory for subsequent retrieval. In addition to use in sensing images, sensor 135 may be used as an ambient light sensor for controlling an electrochromic mirror(s) 40 (FIG. 12).

As shown in FIG. 9, the vehicle communication and control system of the present invention may also include a speech synthesizer (or system for playback of prerecorded messages) 176, a voice recognition circuit 178, a microphone processor 180, an audio and data transceiver 185 (used interchangeably throughout with "Bluetooth™ transceiver," which is the preferred implementation), a Bluetooth™ control circuit 188, and an audio circuit 190. Of these components, voice recognition circuit 178, Bluetooth™ control circuit 188, and speech synthesizer 176 are coupled to a local bus 102. Speech synthesizer 176 responds to commands transmitted over local bus 102 to generate synthesized speech signals that are transmitted over a line 195 to audio circuit 190. Audio circuit 190 may be connected to one or more speakers 192 that are mounted inside the rearview mirror assembly or remote therefrom so as to play back the synthesized speech. Alternatively or additionally, audio circuit 190 may transmit the audio signals via a dedicated connection 197 to the vehicle audio system so as to cause the audio system to interrupt (or superimpose upon) any radio broadcast or other music playing over the audio system and to produce the synthesized speech. Alternatively, Bluetooth™ transceiver 185 may be used to provide an RF connection to the vehicle's audio system so as to eliminate the need for a discrete connection 195 or a connection through the vehicle bus.

Microphone processor 180 preferably provides two separate output audio streams from the microphone subassembly. The first audio stream, which is provided on line 181 to voice recognition circuit 178, is processed differently than a second audio stream provided on line 186 to Bluetooth™ transceiver 185. The noise reduction processing performed by the digital signal processor in microphone processor 180 renders the sounds detected by the microphones better for human listening, however, such noise reduction removes detail that is useful for voice recognition. Thus, the second audio stream is filtered differently than the first audio stream since the processed signal would not be as suitable for use by the voice recognition circuit 178. Microphone processor 180 preferably includes a digital signal processor (DSP).

Bluetooth™ transceiver 185 is configured to be capable of transmitting and receiving both audio signals and data signals. As illustrated, Bluetooth™ transceiver 185 is connected to second RF antenna 116. Both Bluetooth™ transceiver 185 and antenna 116 are preferably mounted to mirror housing 30 as shown in FIGS. 6 and 7A–7D. It should be noted that antennas 114 and 116 could conceivably be combined and then used for both cellular telephone transmissions and Bluetooth™ transmissions.

As described above, Bluetooth™ transceiver 185 may receive audio signals from microphones 142 and 144 via microphone processor circuit 180 over line 186. These audio signals may be modulated and transmitted via antenna 116. Bluetooth™ transceiver 185 is also coupled to audio circuit 190 and to voice recognition circuit 178 such that audio signals received by Bluetooth™ antenna 116 may be played back through the vehicle audio system or a dedicated speaker 192 or otherwise transmitted to voice recognition circuit 178, which recognizes certain voice commands and translates those commands into command signals that are transmitted over local bus 102 and optionally over vehicle bus 106. When data is to be transmitted by Bluetooth™ transceiver 185 to another device, the data is first supplied to Bluetooth™ controller 188 over local bus 102 and then supplied to Bluetooth™ transceiver 185.

When microwave antenna 50 is tuned to receive satellite transmissions from GPS satellites, microwave receiver 80 receives and supplies data over bus 102 identifying the satellites from which transmissions are received, as well as a clock signal from each of the different satellites. In a manner well known in the art, this data may be processed to identify the position of the vehicle in terms of its latitude, longitude, and altitude. Insofar as clock signals are received from the various satellites, receiver 80 also serves as a source of a clock signal that may be used to determine the time of day. This information can be used to determine the vehicle's velocity, heading and position. Vehicle position and GPS time may be used to determine in which time zone the vehicle is located and thereby the local time may always be displayed.

If microwave antenna 50 is tuned to receive signals from one or more CD radio satellites, microwave receiver 80 serves as a source of a CD quality satellite radio broadcast transmission, which may be supplied to an audio system 234 (FIG. 11) via a discrete connection. The audio or other data may also be transmitted via an IR or low power RF link (such as through Bluetooth™ transceiver 185). Audio could be transmitted directly to the vehicle's radio from the mirror assembly on a vacant channel with a low power transmitter. This would be particularly useful in aftermarket and retrofit applications.

As discussed above, microwave receiver 80 may be configured such that microwave antenna 50 receives signals from both GPS satellites and CD radio satellites, in which case microwave receiver 80 would serve as a source of a wide variety of information and audio signals. Moreover, to the extent that microwave receiver 80 could be tuned to receive satellite transmissions from other communication satellites, such information may be displayed on a display 45 or other displays 226 (FIG. 11) connected to vehicle bus 106. Additionally, such information, if provided as a GPS or audio signal, may be transmitted to audio system 234 as described above with respect to CD radio signals. Further still, such information may be simply used and processed by vehicle communication and control system 100 or otherwise transmitted by RF or IR signals to other vehicle components or non-vehicle devices via Bluetooth™ transceiver 185 or IR transmitter 134. The information transmitted may be derived from either the microwave receiver or vehicle bus. Information derived from the vehicle bus may be particularly useful for troubleshooting and diagnostic purposes. Transmission of diagnostic data could be activated by a special vehicle startup sequence such as holding a radio or mirror button or buttons depressed while starting the vehicle. Alternatively, a command could be received via Bluetooth™ transmission or other wireless communication link that would trigger the transmission of the diagnostic data.

Figure 10:
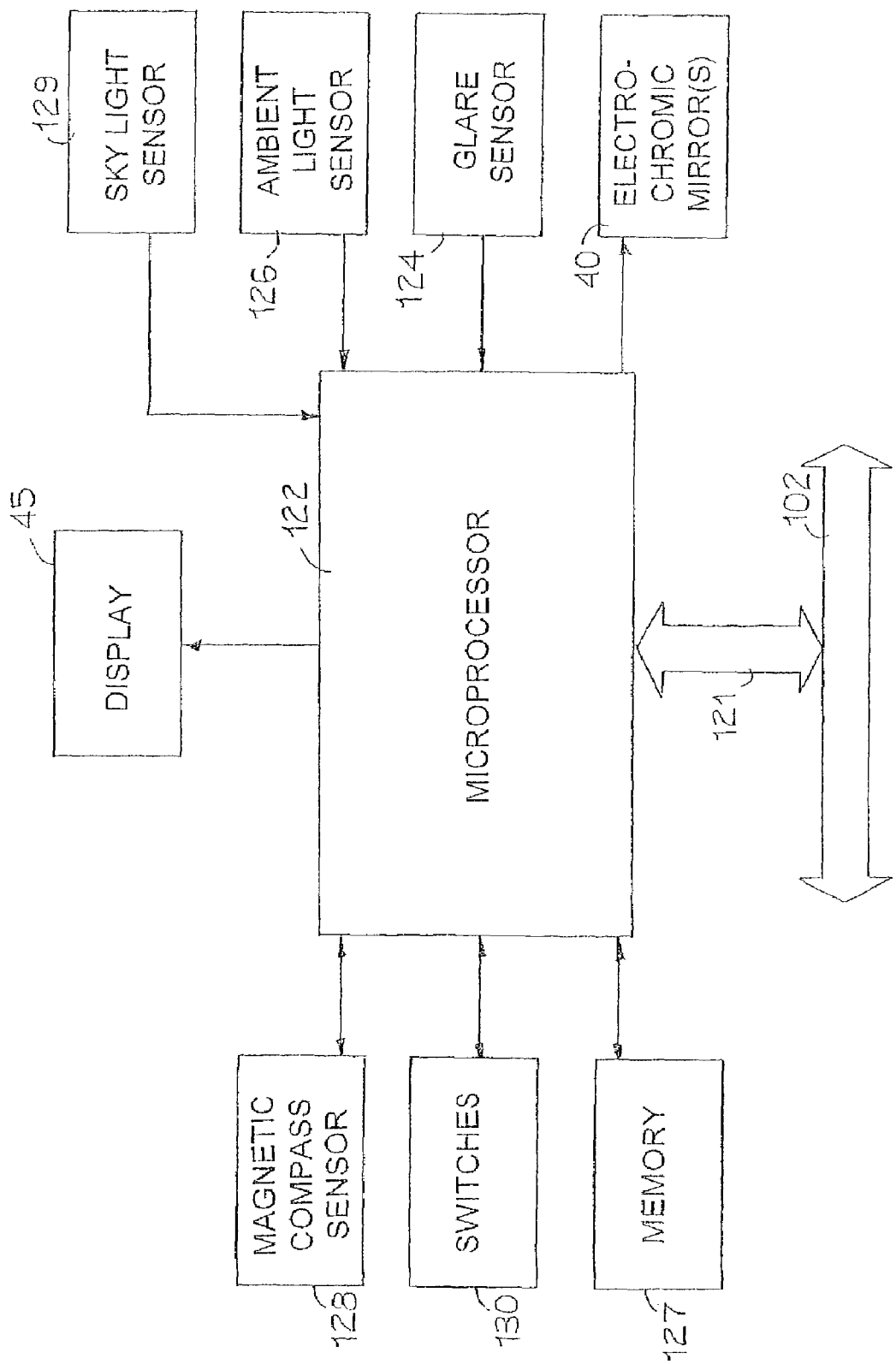
FIG. 10 is an electrical circuit diagram in block form showing an exemplary electrochromic mirror/compass system for use with the present invention.

As shown in FIG. 9, rearview mirror assembly 10 may also include an electrochromic mirror/compass system 120 having a connection 121 to local bus 102. As shown in FIG. 10, electrochromic mirror/compass system 120 has a microprocessor 122 that is preferably coupled at least to the interior electrochromic mirror 40 and optionally to external electrochromic mirror(s) 212 (FIG. 11), which may be coupled thereto by discrete connection or via local bus 102 and vehicle bus 106. As will be described in more detail below, microprocessor 122 may be programmed to change the reflectivity of the electrochromic mirror(s) 40, 212 in response to information obtained from an ambient light sensor 126, a glare sensor 124, as well as any of the other components coupled to microprocessor 122 either directly or through local bus 102 or vehicle bus 106. As is well known in the art, ambient light sensor 126 is preferably mounted in a mirror housing of a rearview mirror assembly in a forward-looking location so as to be exposed to the light conditions in front of the vehicle, whereas glare sensor 124 is typically mounted in mirror housing 30 in a rearward-facing position so as to sense glare from head lamps of vehicles behind the vehicle. A more detailed description of the manner by which microprocessor 122 may control electrochromic mirror(s) 40, 212 is provided in the above-referenced U.S. Pat. No. 6,166,698. Although mirror 40 is preferably electrochromic, mirror 40 may alternatively be a simple prismatic mirror. Alternatively, mirror 40 may be replaced with a display device for providing an image from a rearward facing camera.

Electrochromic mirror/compass 120 may also include a memory device 127 coupled to microprocessor 122. Memory device 127 may be external to microprocessor 122 or internal, depending upon the need for additional memory. The depicted memory device 127 represents both volatile and non-volatile memory as needed for the system.

As shown in FIGS. 6 and 10, rearview mirror assembly 10 may include a plurality of user-actuated switches 130 that provides user input information to microprocessor 122. Such switches may cause microprocessor 122 to change information displayed on display 45 or to deactivate the electrochromic mirrors 40, 212, or to initiate or answer a telephone call, to name just a few functions that may be affected through user actuated switches.

Display 45 may be located behind the reflective surface of the mirror or mounted adjacent the mirror in the mirror housing. Alternatively, display 45 may be mounted in front of the reflective layer and across part or the entire surface of the mirror. A suitable display for mounting in front of the reflective layer is an organic LED display. An example of such an organic LED display in a mirror is disclosed in commonly assigned U.S. patent application Ser. No. 09/311,955, the entire disclosure of which is incorporated herein by reference.

Display 45 is preferably a vacuum florescent display including at least ten seven-segmented character display areas, and preferably including at least sixteen such character portions. Using conventional technology, such a large display requires a 42 volt power supply. However, using the techniques disclosed in commonly assigned U.S. patent application Ser. No. 09/359,616 entitled LOW EMI MULTIPLEXED DUAL DISPLAY, filed on Jul. 22, 1999, by Robert R. Turnbull, the display may be driven using a 12 volt power supply and will also exhibit substantially lower electromagnetic interference. The entire disclosure of U.S. patent application Ser. No. 09/359,616 is incorporated herein by reference.

The display may provide various information including the vehicle heading, the external temperature, telephone numbers, roaming information, telephone and voice signal strength information, paging messages, control menus and selections, e-mail, navigational directions, diagnostic information, voice mail icons, traffic reports, news, weather, tire pressure warnings, blind spot warnings, stop sign/traffic light warnings, maintenance reminders, and any other information available on the Internet. Additionally, the display may be used to provide positive feedback to the user as to which button a user has depressed. For example, if a user has pressed a "911" button, an indication to this effect may be displayed on display 45.

As noted above, display 45 may be mounted behind mirror 40 such that the display is visible through a window provided in the reflective surface of mirror 40. The window may be formed by completely removing or partially removing reflective material on the reflective surface. Alternatively, the window may be provided by forming a partially transmissive or partially reflective area in the reflective surface. The window may also include a number of regions devoid of reflective material. Creation of such devoid regions allows the display to be visible through the reflective surface of the mirror. The devoid regions can be created in the reflective surface through a number of techniques, such as etching (laser, chemical or otherwise), masking during deposition, mechanical scraping or sand-blasting. These techniques are well known to those skilled in the art and as such are not further discussed herein. An example of an electrochromic mirror having such a display window is disclosed in commonly assigned U.S. Pat. No. 5,825,527, by Jeffery Forgette et al., the disclosure of which is incorporated herein by reference.

Preferably, the entire reflective surface could be partially reflective and partially transmissive such that no "window" need be provided and the display could be positioned anywhere behind the mirror and have any size or configuration. Display 45 may also be comprised of a plurality of separate displays. Examples of electrochromic mirror assemblies having partially transmissive reflective surfaces are disclosed in commonly assigned U.S. patent application Ser. No. 09/311,955, entitled ELECTROCHROMIC REARVIEW MIRROR INCORPORATING A THIRD SURFACE METAL REFLECTOR AND A DISPLAY SIGNAL LIGHT, filed on May 14, 1999, by William L. Tonar et al., the entire disclosure of which is incorporated herein by reference.

As will be explained in further detail below, vehicle communication and control system 100 may include an IR transmitter 134 for transmitting an IR signal into the interior passenger area of the vehicle. This IR signal may include any data or other information intended for portable electronic devices that may be located in the passenger area. If such devices have an RF receiver, Bluetooth™ transceiver 185 may be used for that purpose.

Vehicle communication and control system 100 may also include a receiver intended to receive RF signals or the like from remotely located transmitters such as an RKE transmitter or tire pressure monitoring sensors.

As will become apparent to one skilled in the art from the description of the various functions below, vehicle communication and control system 100 may include various combinations of the elements identified above and shown in FIG. 9, and thus need not include each and every element described above. Further, although each of the elements shown in FIG. 9 may be housed within rearview mirror assembly 10, some or all of the components may be provided in other remote locations and transmit and receive information over vehicle bus 106 or via RF Bluetooth™ transmissions. Further, the various components that may be mounted in rearview mirror assembly 10 may be mounted in either mounting foot 36 or mirror housing 30 with appropriate electrical connections made therebetween.

FIG. 11 shows an example of some systems and other electrical devices within the vehicle that may be connected to vehicle bus 106, and hence in electrical communication with the various components that are mounted in mirror assembly 10. Specifically, the following are a few examples of the components that may be coupled to vehicle bus 106: navigation system 210, external rearview mirrors 212, interior lights 214, head lamp controller 216, tire pressure monitoring system 218, speedometer 220, climate control system 222, clock/display 228, engine control system 230, temperature sensor 232, audio system 234, odometer 236, the vehicle windshield wiper controller(s) and various other switches 224 and other display devices 226 that may be located throughout the vehicle.

By providing both Bluetooth™ transceiver 185 and an internal telephone 170 in the vehicle communication and control system, an individual having a relatively low power portable cellular telephone may effectively utilize a higher powered cellular telephone 170 when inside or otherwise within range of the Bluetooth™ transceiver 185 in a manner similar to how a ZONE™ telephone operates. See, for example, U.S. Pat. No. 5,745,850. Specifically, Bluetooth™ transceiver 185 may be trained or otherwise configured to look for signals transmitted from a person's portable telephone and then transfer the received signals to internal telephone 170 for transmission at a higher power. Likewise, incoming signals may be received by internal telephone 170 and transferred to the portable telephone handset via Bluetooth™ transceiver 185. Internal telephone 170 may be provided for emergency calls only and any cellular telephone calls are made through the driver's portable telephone, which in turn are transmitted through the internal telephone which transmits at a higher power level. This is also advantageous for vehicles in Europe where use of handheld telephones in vehicles is illegal. For example, once a user comes within range of their vehicle, their portable telephone is disabled and the hands-free telephone installed within the mirror is activated without disruption of the telephone call. Such a hand-off from a portable telephone to internal telephone 170 may also occur upon detection that the vehicle alarm has been deactivated, a door has opened, the ignition key is inserted into the vehicle ignition, the ignition is turned on, the vehicle is put into gear, the vehicle is travelling above a threshold speed, or any combination of these events. Likewise, any of these events may trigger an automatic hand-off from internal telephone 170 to the portable telephone. For example, detection that the vehicle ignition has been turned off and/or opening of the door may trigger such an automatic hand-off. Alternatively, a manually activated call transfer button or voice activated command may be used to manually cause a call transfer. Such a manual switch may be provided on either or both of the portable telephone and internal telephone 170.

To enable such call transfer, a unique ID code associated with, and transmitted by, one or both of the Bluetooth™ compatible transceivers of the portable telephone and internal telephone would be input into the other so that the respective telephone will not respond or attempt to transfer control, or partial control, of a call function to the telephone of a third party.

While it is generally desirable to transfer the entire call functionality to internal telephone 170, it will be appreciated that only some of the call functions may be transferred. For example, it is possible to transfer (or duplicate) the microphone and speaker functions of the portable telephone to those of internal telephone 170. In this manner, the transceiver, antenna, and keypad of the portable telephone would continue to function while enabling hands-free use of the speaker and microphone of internal telephone 170 with the audio transmitted through a Bluetooth™ or similar communication link. As yet another example, the keypad and other call initiation features (redial/speed/memory dialing) of the portable telephone may remain functional while the transceiver, antenna, microphone, and speakers of internal telephone are used.

Another possibility is that the driver or other vehicle occupant may utilize a headset having a low power RF Bluetooth™ transceiver for communicating with Bluetooth™ transceiver 185 provided in rearview mirror assembly 10. The vehicle occupant may then make cellular telephone calls using this headset, Bluetooth™ transceiver 185, and internal telephone 170 and may also speak into the headset microphone and have voice commands transmitted to Bluetooth™ transceiver 185 and then transferred to voice recognition circuit 178 where those voice commands are translated into control signals that are transmitted over local bus 102 and optionally vehicle bus 106 to thereby affect various vehicle functions.

Provided that the portable headset or portable cellular telephone carried by a person is Bluetooth™ compatible, virtually any level of interaction between internal telephone 170 and the headset or portable cellular telephone is possible. For example, the cellular telephone or headset may include a unique serial number that may be transmitted from the cellular telephone or headset by its Bluetooth™ transceiver. When the portable cellular telephone or headset is brought within range of Bluetooth™ transceiver 185, any portion of the telephony functions may be transferred to internal telephone 170. Conversely, a call initiated using the internal telephone 170 may be transferred to the portable telephone or headset. For example, the keypad on the cellular telephone may be used as a means for initiating a telephone call by internal telephone 170. Additionally, the microphone and/or speaker of the portable telephone may be disabled with those functions being performed by the microphone and speaker within the vehicle while the remainder of the call processing and call transmission is handled by the portable cellular telephone. Further still, the portable cellular telephone could be used for RKE functions and/or disabling the vehicle alarm or otherwise activating the lights within or on the vehicle for illuminated entry. This can be performed simply by having the Bluetooth™ transceiver 185 continuously monitor for the presence of another Bluetooth™ transceiver having the known unique identification number corresponding to the driver's cellular telephone. Also, a person may utilize their cellular telephone as a mechanism for unlocking the vehicle doors if they lock their keys in the car. More specifically, a person could bring their cellular telephone within range of Bluetooth™ transceiver 185 and either dial in a sequence of numbers representing a door unlock code, speak into the microphone such that voice recognition circuit 178 responds to a command to unlock the doors, or dial a telephone number associated either with the vehicle or with a service organization that allows the person to either directly or indirectly communicate with the vehicle from a distance to either lock or unlock the vehicle doors.

Internal cellular telephone 170 is preferably a dual-band tri-mode analog/digital telephone. Internal telephone 170 may be configured to utilize any of the standard communication protocols including AMPS, GSM, TDMA, IDEN, or CDMA. By providing internal telephone 170, the vehicle occupants are provided with a hands-free telephone, a means for receiving electronic mail, voice mail, Internet access, weather reports, news reports, traffic reports, and other useful information. Additionally, the vehicle occupants may use the telephone to access concierge services. By providing GPS receiver 80 in addition to cellular telephone 170, a system is provided whereby an emergency 9-1-1 call may automatically be placed upon detection of airbag deployment or activation of an emergency switch. Upon such activation, telephone 170 dials 9-1-1 and transmits with the signal the vehicle location as determined by GPS receiver 80. In this way, if the vehicle occupants are unconscious, emergency vehicles may still be deployed to the identified location.

By integrating the cellular telephone, Bluetooth™ transceiver, microphone processor 180, and voice recognition circuit 178 in a common accessory, the system benefits from the integration by only requiring a single digital signal processor (DSP) circuit. This clearly eliminates the cost of providing separate digital signal processors in these components when they are located at different locations throughout the vehicle.

Another advantage of incorporating voice recognition circuit 178 in the control system is that voice recognition circuit 178 may be used to perform certain voice recognition functions that assist an automated call answering system having its own voice recognition functions. Such call answering systems are becoming more commonplace since individuals utilizing hands-free telephones often do not have easy access to a keypad to press numbers when prompted by the automated call answering service. Thus, these services typically request the caller to audibly speak one of the various options. The automated call answering system then performs voice recognition on the spoken option to determine how to further process the call. One problem facing such automated call systems is that there is limited bandwidth through which such spoken options are transmitted over the telephone lines. The use of cellular telephones, which may not always transmit a clear signal, creates further problems.

To improve the effectiveness of such systems, a vehicle equipped with its own voice recognition circuit 178 may allow for prerecognition of a spoken command within the vehicle. Speech synthesizer 176 may then produce a synthesized voice command that is transmitted to the automated call answering system. Provided that all speech synthesizers produce a synthesized voice that is substantially the same, the voice recognition circuitry in the automated call answering system may function much more accurately since it does not have to process a very wide variety of speech patterns transmitted from all of the users of the system. Further, the voice recognition circuit (178) in a vehicle may be trained to the driver's specific voice patterns thereby providing much more accurate voice recognition processing. Further still, voice recognition circuit 178 is not limited by a restricted bandwidth when receiving the voice commands that it must recognize.

A further option is to have voice recognition 178 recognize a spoken command (i.e., a number, pound sign, etc.) and to have the system transmit additional data over the wireless telephone link data that will assist a voice recognition system within an automated call answering system to recognize the spoken command. In this case, the spoken command would still be transmitted over the wireless telephone link in the driver's own voice, but the additional data transmitted with the spoken command would allow more accurate recognition by the automated voice answering system.

An alternative option is to employ vocal recognition in the car to recognize any spoken number, pound sign or star in the outgoing telephone signal. Immediately after the recognition, the processor would add the appropriate DTMF tone for that keypad option. At the receiving end, any voice mail system or service provider capable of DTMF tone control would respond to the signal. This would allow hands-free activation of voice mail, remote dialing and menu options requiring/desiring a keypad entry with no keypad. The driver would not have to hear these tones, and thus, such a system would prevent the tones from distracting the driver. Another vocal command or switch could be used to turn this feature on and off, if necessary.

In general, the voice recognition circuit may be used to recognize any spoken command during such time that a call is not in progress. Once a call is in progress, the voice recognition may be selectively turned off so as not to inadvertently invoke commands based upon words spoken during the telephone conversation that are not intended to invoke such commands. On the other hand, when the voice recognition circuit is to be utilized to perform functions during a telephone call, a specific key word can be utilized that is not commonly used in conversation so as to place the system in a voice recognition mode. Such would be desirable when, for example, a call is placed through an automated call processing network that asks for an individual to press a number on a key pad.

As shown in FIG. 9, the vehicle communication and control system may further include a backup power or battery component 200. As illustrated, this circuit includes a connection 204 to the vehicle battery or ignition through cable 86. Component 200 preferably includes a large capacitor or capacitor bank 202 that stores a sufficient amount of energy that is received from vehicle battery/ignition so as to enable the system to still operate for a brief period should the connection to the vehicle battery/ignition be disrupted. A primary or rechargeable battery may alternatively or additionally be used. The capacitor bank may be charged to a relatively high voltage using a flyback, boost, or other switching power supply. Since $E=\frac{1}{2}CV^2$, more energy can be stored using a higher voltage. The stored energy can then be used to power a flyback, buck, or other switching power supply to provide regulated low voltage to the cellular telephone. Alternatively, a bi-directional power supply may be used to charge and discharge the capacitor bank. Thus, for example, if the vehicle is in an accident and the rearview mirror assembly becomes disconnected from the vehicle ignition or battery, the internal telephone 170 may still make the emergency 9-1-1 telephone call and transmit the vehicle location. Alternatively, internal telephone 170 could initiate an emergency call and then transfer control of the call to the vehicle occupants' portable telephone if it is present and active. This would allow the emergency call to stay active for a longer period of time given that portable telephones typically have a relatively long battery life. It should further be noted that internal telephone 170 may be configured to provide less than full functions of a cellular telephone and thus only be provided for purposes of emergency telephone calls. By transmitting an emergency signal to an individual's portable telephone and appropriately programming the portable telephone, both internal telephone 170 and the portable telephone provide a redundancy when making emergency calls that may be critical. For example, in the event one of the telephones is disabled in a serious accident, such redundancy increases the likelihood that the distress call will be completed.

To ensure that the backup battery is fully functional in cold weather climates, a heater 157 may be utilized to heat the battery upon detection that the vehicle ignition has been turned on so as to quickly improve the functionality of the battery in cold weather in the event that an emergency or other need for the backup battery results before the battery may otherwise heat up as a result of the vehicle climate control system.

By providing GPS receiver 80 and internal telephone 170 in the vehicle communication and control system, the system may be utilized to track the location of the vehicle. This is particularly useful when the vehicle is stolen. Upon notification that the vehicle is stolen, the owner or the police may call the vehicle and request location information from GPS receiver 80. This information may then be transmitted through internal telephone 170 and utilized for the police to locate or disable the vehicle. Also, the transmitted information may include information about any accident in which the vehicle is involved. For example, this information could include the speed of the vehicle prior to the accident, whether the vehicle rolled over, whether the air bags deployed, deceleration data, and other data indicating crash dynamics and the severity of the accident. Such information can be very helpful in determining which emergency vehicles to dispatch to the scene of the accident.

While integration of the components of the invention into a single accessory such as a rearview mirror assembly makes the system much easier and less costly to install, it is conceivable that a would-be thief could simply rip the rearview mirror assembly off the windshield and throw it from the vehicle or otherwise cut any exposed cables. One solution to this potential problem is to provide a module within engine control system 230 or within some other component connected to vehicle bus 160 or another Bluetooth™ transceiver that periodically polls a component located within a rearview mirror assembly to determine its presence. Then, if the engine control system component or other component remotely located from the mirror assembly determines that the rearview mirror assembly has been disconnected from the vehicle bus, the engine control system executes a routine that disables the vehicle by causing it to slowly come to a stop and prevent further movement of the vehicle. Alternatively, the vehicle would stop and refuse to restart if the vehicle speed dropped below a predetermined speed with the security mirror removed. The backup power in the rearview mirror assembly could simultaneously be utilized to at least track the location of the rearview mirror assembly and provide the police with an approximate location of the stolen and disabled vehicle.

Additionally, the vehicle communication and control system 100 provided in rearview mirror assembly 10 may have a particular serial number or rolling code that it transmits back to the polling engine control system component such that the engine control system component may ensure that a thief has not simply switched rearview mirrors or otherwise installed some form of module that would fool the engine control system component.

It is also preferable that at least one component within the system shown in FIG. 11 periodically determines the status of the other components to ensure they are present and operational. If any one component is disabled, the component checking the status of the other components within the system may then appropriately interact with the engine control module so as to disable the vehicle in the manner discussed above.

The Bluetooth™ transceiver 185 may also be utilized in connection with an RF identification tag implemented in an individual's key fob to actively sense when the RF identification tag is proximate the vehicle. When the RF identification tag comes into close proximity to the vehicle such that the Bluetooth™ transceiver 185 can detect transmissions from the RF identification tag transponder, commands may be sent via Bluetooth™ controller 188 and buses 102 and 106 to various electronic components within the vehicle. For example, upon detecting the RF identification tag for a particular individual, the system may adjust the seats and mirrors and even the radio presets for that particular person. Additionally, various other electronic components can be personalized and automatically selected for the individual identified in the RF identification tag. For example, an individual may program the system to perform different and personalized functions in response to actuation of any of the switches 130. Additionally, the identification of the person entering the vehicle may be used to select the appropriate data in the voice recognition circuit for most effectively recognizing the voice of that particular individual.

A transceiver located in the vehicle rearview mirror assembly may also be used to energize and/or receive confirmation of the presence of a transponder on the ignition key or in a key fob. In the absence of such confirmation, the control circuit in the rearview mirror may transmit a signal preventing starting of the vehicle. Alternatively, the vehicle engine modules may be programmed not to start the engine in the absence of a signal from the rearview mirror indicating that the proper signal is received from the transponder on the vehicle owner's key or key fob. The transceiver in the rearview mirror may continue to interrogate the transponder and disable the vehicle if the transponder is no longer present. By placing the rearview mirror in this vehicle control loop, the vehicle will not start if a thief removes the rearview mirror assembly from the vehicle in an effort to remove the remote vehicle tracking feature from the vehicle.

Additionally, Bluetooth™ transceiver 185 may be used for detecting signals from tire pressure sensors provided in the vehicle tires. When the pressure in a tire falls below a threshold level, Bluetooth™ transceiver 185 may generate a warning signal that is either audio and/or visual.

Bluetooth™ transceiver 185 may also be used to receive RKE RF signals and respond by unlocking vehicle doors and disarming a security system. Further, Bluetooth™ transceiver 185 may be used to transmit garage door opening signals and other control signals to various receivers in a person's home, security gate, or other building.

The Bluetooth™ transceiver 185 may also be used to transmit diagnostic information to the user and out of the car.

Another use for the Bluetooth™ transceiver is to detect whether or not there is a similarly equipped vehicle in the vehicle's blindspot. Specifically, when a driver activates the turn signal, Bluetooth™ transceiver 185 receives a command via buses 1066, 102, and Bluetooth™ controller 188 and responds by transmitting a signal indicating that a turn is about to be completed in a particular direction. The adjacent vehicle may then receive the signal and generate a warning signal or otherwise respond back to the vehicle with its turn signal on so as to warn the driver of the turning vehicle that there is a vehicle in its blindspot. Additionally, Bluetooth™ transceiver 185 may receive signals from stop signs or traffic lights indicating their presence or their particular status so as to warn the driver in advance. As shown in FIG. 7A, a number of colored indicator lights 159 may be provided on the rearview mirror assembly to display the status of the traffic lights. Specifically, a first indicator light 159*a* may be a red light, a second indicator light 159*b* may be a yellow light, and a third indicator light 159*c* may be a green indicator light. This will enable drivers to merely look at the rearview mirror to see the status of a traffic light in such circumstances where the sun is in their eyes or their view of the traffic light is otherwise impeded by the vehicle roof or other obstacle.

Further still, Bluetooth™ transceiver 185 may be utilized to transmit and receive information for payment of tolls at toll booths or payment of various expenses by transmitting a credit card number or debit card number and passcode to an external receiver.

By providing sufficient memory in system 100, the system may be utilized as a data/accident recorder or black box. The black box may store information such as the speed the vehicle was traveling prior to a crash. Other accident reconstruction information can also be stored such as readings from gyroscopes, suspension systems, air bag deployment sensors, roll sensors, GPS data, and other devices or sensors that indicate dynamics of a crash. The memory may also store a history of the speed, direction, driver input, ambient temperature, and other information available on the vehicle bus or other interface, such that this information may be read from memory to prove that the vehicle was traveling at a specific speed to either serve as additional evidence that a speeding ticket was or was not warranted.

Electronic vehicle compass systems are known that include electronic compass sensors for sensing the earth's magnetic field, and generate an electrical signal representing the vehicle's direction of travel based upon the sensed magnetic field. Such systems are typically calibrated based upon sensor readings obtained while driving the vehicle through one or two closed loops. Such calibration techniques are also well known and described in U.S. Pat. No. 5,761,094. These known electronic compass systems compensate the compass sensor readings based upon the calibration data as well as other filtering parameters, and display the current vehicle heading on a display device commonly provided in the overhead console or interior rearview mirror of the vehicle. One of these parameters is used to adjust the vehicle heading based upon a geographical zone of variance in which the vehicle is currently located. Typically, a user is required to manually input in which zone the vehicle is currently located. U.S. Pat. No. 5,761,094, however, utilizes vehicle position data obtained from a GPS receiver to determine the vehicle's current location and to determine which zone of variance the compass system should use to further compensate the sensed vehicle heading.

As noted above, the prior art electronic compass systems all utilize some form of device that senses the earth's magnetic field. Such sensing devices are relatively expensive and must be mounted in particular locations within the vehicle so that the sensors are not adversely affected by the metal structure of the vehicle, which may introduce errors to the magnetic sensors. Such magnetic sensors are also susceptible to errors resulting from driving over railroad tracks and driving in large cities. Further, the compasses must be calibrated for each different model vehicle in which it is mounted, since the body style of these different model vehicles may have differing effects on the way in which the compass sensors sense the earth's magnetic field and sense the vehicle's current heading.

The compass system according to the present invention overcomes the problems noted above with respect to conventional electronic compass systems. According to one aspect of the present invention, the compass system includes an electronic compass sensor for sensing the earth's magnetic field and for generating an electrical signal representing the vehicle's direction of travel based upon the sensed magnetic field, a microwave receiver for receiving transmissions from satellites of a position identification system constellation and for generating vehicle position data from the satellite transmissions, a control circuit coupled to the electronic compass sensor and to the microwave receiver for determining the vehicle's direction of travel from the vehicle position data received from the microwave receiver, adjusting the vehicle's direction of travel as identified by the electronic compass sensor using calibration data, comparing the vehicle's direction of travel as determined using the vehicle position data with the vehicle's direction of travel as received from the electronic compass, and recalibrating the compass system when the vehicle's direction of travel as determined by both the microwave receiver and the adjusted electronic compass sensor readings are not substantially the same. The compass system further includes a vehicle direction indicator, such as display 45, coupled to the control circuit for advising a vehicle occupant of the vehicle's direction of travel.

If combined with a magnetic sensor, the GPS heading data may be used to provide continuous calibration correction for the magnetic sensor, allowing placement of the magnetic sensor in a non-fixed location, such as inside the movable portion of the rearview mirror assembly. Magnetic, angle rate, speedometer, odometer, or other inertial sensor data can then be used to supplement GPS data when buildings or other environmental obstacles interfere with reception of the GPS satellite constellation.

According to yet another aspect of the present invention, the inventive compass system does not include an electronic compass sensor or any other form of sensor that senses the earth's magnetic field, but instead utilizes vehicle position data that is derived from transmissions received from satellites of a position identification system constellation utilizing a microwave receiver that is mounted in the vehicle. By utilizing the vehicle position data that is available from microwave receiver 115, a control circuit including microprocessor 110 may use this data to directly determine the vehicle's current heading, which is subsequently displayed on display device 45.

Because it is possible that tunnels or tall buildings may at times block the signals from some of the satellites that are otherwise needed to accurately determine the vehicle heading, the present invention preferably utilizes information obtained from the vehicle speedometer and a gyroscope, wheel speed sensors, or the like to compute the heading using dead reckoning. The heading computed using dead reckoning may then be compared with that obtained from the GPS receiver to more accurately determine the actual vehicle heading. For example, if the GPS unit is indicating a change in heading but the gyroscope has not detected that the vehicle has turned, the compass processor may determine that the displayed heading should not change. Alternatively, the processor may use the dead reckoning heading as a filter mechanism for the heading obtained from the GPS unit. For example, if the heading obtained by the GPS unit changes and the gyroscope has indicated that no change in direction has occurred, the compass processor may maintain the presently displayed heading for a predetermined time period at which point the processor will either change the heading to correspond to that obtained from the GPS unit or will maintain the heading if the heading obtained from the GPS unit fluctuates back and forth during this time period. Thus, dead reckoning may be utilized not only when the GPS unit determines that there is an insufficient number of satellite signals received, but may be used at all times to improve the accuracy of the vehicle heading that is displayed or otherwise communicated to the driver.

Thus, the inventive electronic compass system may be constructed without utilizing an electronic compass sensor, and may therefore provide accurate vehicle heading information independent of the earth's magnetic field and its inherent anomalies when sensed by a sensitive electronic compass sensor. Accordingly, much of the expense of providing such magnetic field sensors may be eliminated.

The GPS unit may compute the vehicle location and heading autonomously or the vehicle location and heading may be computed with the aid of a network. This network-aided navigation techniques distributes the processing demands necessary to compute the vehicle location and heading to other processors either within the vehicle or external to the vehicle. For example, the GPS receiver in the vehicle may be used to collect information from the satellites and then transmit this information via internal telephone 170 to a base station which performs the computations and transmits the heading and/or vehicle location back to the vehicle. Such a system allows for the use of less-expensive processing circuits in the vehicle's system. Similarly, the processing power demands could be performed by another processor located elsewhere in the vehicle. The communication of the information obtained from the GPS receiver may be transmitted to that other processor either over the vehicle bus or via a discrete wire or wireless link. For example, the information could be transmitted by means of Bluetooth™ transceiver 185 or another RF or IR link. Yet another alternative is that the processing of this information could be performed by the driver's portable computer or personal digital assistant and such information could be transmitted to that device by means of a Bluetooth™ transceiver or IR link.

One benefit of having much of the vehicle location and heading processing performed by a base station is that the base station may provide a clock signal that is received from GPS satellites and that has an accuracy approaching that of an atomic clock. Such a base station would require less satellite signals to be received by the vehicle to accurately compute the vehicle heading. Additionally, the system could be programmed to only communicate with a base station when it determines that it does not have sufficient satellite signals to accurately compute the vehicle heading or location. Another benefit to such shared processing with a base station is that the base station may also transmit other data with the vehicle location/heading. Such information may include traffic or construction information along with recommended detours.

Another feature enabled by the present invention is a navigation system. The navigation system may provide visual information to the driver on a display or audible driving instructions that are downloaded into memory and communicated to the driver using speech synthesizer 176 or audio playback/decompression system (i.e., mp3, wav, or other audio format). Such direction information could be presented to the driver at each leg of a given trip based upon the determined location of the vehicle as it approaches an upcoming turn or exit. While there are many navigational systems disclosed in the prior art that utilize data from a GPS unit, many of these systems require vast amounts of map data to be stored within the vehicle. Furthermore, when such vast amounts of information are stored in the vehicle, the information may quickly become out of date and not provide information such as information pertaining to construction or traffic congestion. In addition, a large and expensive non-volatile memory would need to be utilized in the vehicle to store all of this information. According to one aspect of the present invention, an Internet web site may be provided that contains accurate and up-to-date information including any map data, directional data, points of interest; traffic congestion information, and construction information. A driver may access such a web site and provide their origination and destination locations so as to download only information pertaining to that particular trip into either a portable storage medium or into memory within the vehicle via an RF or IR wireless link. Alternatively, this information could be downloaded into the vehicle via the internal telephone provided in the vehicle. Such information may include visual map data limited to that along the route to be traveled. The information could also include audible and/or visual prompts that are played back by speech synthesizer 176 over the vehicle audio system or an internal speaker or displayed by the mirror display. The information may further include points of interest such as gas stations, restaurants, and lodging facilities.

The microphone and voice recognition portions of the system may be utilized by the driver to input inquiries such as "identify closest gas station." The system may then access the downloaded information and either display the location of the closest gas station on the map display and/or play back a synthesized audible message identifying the location of the gas station and giving directions.

The advantage of such a system is that it does not require excessive amounts of memory to be provided in the vehicle and the information that is stored in the vehicle is much more current than in prior systems.

Another way in which the information may be requested and downloaded would be through requests entered by the driver within the vehicle by way of a cellular telephone call from internal telephone 170 to a service center. The service center may have, for example, voice recognition capabilities such that the driver may simply state the desired destination into the microphone of the vehicle such that the destination information may be sent to the automated call service center along with GPS information identifying the current location of the vehicle. The information may then be translated by the automated call center into route information that is subsequently transmitted back to the vehicle's navigation system.

Various features of the telematics rearview mirror assembly described above may be enabled or disabled depending upon the status of the vehicle. For example, when the vehicle ignition is off, the system may be utilized to receive RKE signals. When the vehicle ignition is on, the system need not receive RKE signals. Similarly, the cellular telephone may be disabled when the vehicle doors are locked and the alarm is activated. Moreover, the telephone may further be activated if the vehicle's transmission is in drive or if the vehicle is travelling at a speed exceeding a threshold level.

Additionally, the telephone within the rearview mirror may be disabled when a key is not in the vehicle ignition except, perhaps, for enabling a call to be made to 911 for emergency purposes. Such disabling would possibly prohibit unauthorized calls by someone breaking into the vehicle.

Features within the above-described telematics mirror may also be enabled, disabled, or modified based upon location information derived from the in-vehicle GPS and navigation systems. More specifically, the navigation system may include a database of local regulations and, based upon the location of the vehicle as derived from the GPS system, the system may enable or disable certain features of the vehicle and/or telematics system. For example, in some locations, local ordinances dictate that only hands-free telephones may be operated in a vehicle, whereas in other locations, telephones may have been completely banned from use. In still other locations, telephones may be used only as hands-free telephones when the vehicle is in motion. All of these features could be effectively enabled or disabled based upon input from the GPS system, navigation system, and from the vehicle status information (i.e., vehicle speed or transmission information). Additional features that may be enabled or disabled that may be included in the rearview mirror assembly include a speed limit warning and/or engine governor that determines the speed limit for the road on which the vehicle is traveling based upon the GPS location signal and navigation database, and generates a warning if the speed of the vehicle exceeds the speed limit or a reasonable threshold above or below the speed limits. The system could also be used to govern the vehicle's engine so as to prevent a person from exceeding the speed limit or a reasonable range above the speed limit. Similarly, a radar detector in the vehicle may be selectively enabled or disabled based upon the GPS location signal and data obtained from the navigation database as to whether or not radar detectors are permitted in the location in which the vehicle is being driven.

Another feature that may be included in a rearview mirror assembly is a rain/fog sensor. The rain/fog sensor may generate a control signal to turn on or off the vehicle windshield wipers based upon a detection of moisture on the vehicle windshield. The connection to the vehicle windshield wipers may be utilized to disable the windshield wipers in situations where the, GPS system does not detect any GPS satellites in the sky. When GPS satellites are not detected in the sky, this could serve as an indication that the vehicle is inside of a car wash, in which case it would be desirable to disable entirely the ability of the operator of the vehicle to activate the windshield wipers. When windshield wipers are activated in a car wash, there is a significant possibility that the windshield wipers could be ripped off the vehicle by the car wash brushes. In general, operators of the car washes pay for such damage caused to a vehicle. Further, the time and effort required to have the windshield wipers replaced creates an additional burden on the owner of the vehicle. Thus, there is a need for a system that disables the windshield wipers of a vehicle upon entry into a car wash. Another mechanism that could be used to disable the windshield wipers is to provide a transmitter that transmits a predetermined RF control signal, at the entry to each car wash. The telematics rearview mirror of the present invention could be used to sense the RF control signal transmitted from such a transmitter and respond by disabling the vehicle's windshield wipers. Additionally, the system could respond by lowering the vehicle's radio antenna (if the vehicle includes such an automatic antenna), and also to roll up and lock the vehicle windows and to close a sunroof, if present.

In addition to the functions above, any of the functions disclosed in U.S. Pat. No. 6,166,698 may also be performed by the inventive vehicle communication and control system.

FIG. 12 depicts a cross-sectional view of an exemplary mounting structure 636 for a rearview assembly, which provides an image of a scene at a rear of a vehicle, according to one embodiment of the present invention. In a typical implementation, a rearview mirror is attached, via a mounting stem 638, to the mounting structure 636. The mounting structure 636 houses a tri-band antenna module (e.g., antennas formed on a printed circuit board (PCB)) 650 and is configured for mounting to a conductive mounting button 656 that is attached to an inside surface of the vehicle windshield 620. The conductive mounting button 656 is configured in a similar manner to the mounting puck/button 56 (see FIG. 3). Similar to the assembly 10, the rearview assembly of FIGS. 12 and 13 may include a shroud 688 that extends from mounting structure 636 to a vehicle headliner, so as to provide a covert channel for running cabling 686 between rearview assembly and the remainder of the vehicle.

The mounting structure 636 is attached to the button 656 with a mounting screw 664 (not shown in FIG. 12) that threads into a threaded aperture formed in a surface of the button 656 that is opposite the surface that attaches to the inside surface of the windshield 620. In one embodiment, the tri-band antenna module 650, which includes a patch antenna 692 and a dual-band cellular antenna 691, is mounted adjacent (e.g., within 1 mm) the button 656 so as to achieve capacitive coupling between the button 656 and a ground plane 694 of the module 650. When implemented as a GPS antenna, the patch antenna 692 operates at about 1.57542 GHz. In one embodiment, the dual-band cellular antenna 691 operates in a first range from about 824 to 894 MHz and in a second range from about 1.85 to 1.99 GHz. In certain situations, it may be advantageous to electrically couple the button 656 to the ground plane 694 of the module 650 with a conductor 689. According to one embodiment of the present invention, the dual-band cellular antenna 691 and the patch antenna 692 share a common counterpoise, i.e., the ground plane 694. As used herein with respect to FIGS. 12–16, the term 'counterpoise' is interchangeable with the term 'ground plane'.

In yet another embodiment of the present invention, the module 650 is oriented such that the cellular antenna 691 is located adjacent the mounting button 656 and the patch antenna 692 is oriented nearest a roof of the vehicle. In still another embodiment, the cellular antenna 691 and the patch antenna 692 are substantially parallel to the inside surface of the vehicle windshield 620 and are located at a distance 'X' of about 1 mm to 3 mm from the inside surface of the vehicle windshield. Locating the tri-band antenna module 650 adjacent the inside surface of the vehicle windshield 620 can advantageously allow the size of the antennas 691 and 692 to be reduced as the windshield 620 acts as a dielectric cover, which lowers the resonance frequency of the antennas 691 and 692, when in relatively close proximity to the module 650. Further, the gains of the antennas 1 and 2 may be increased due to the fact that the conductive mounting button 656 increases the area of the ground plane 694, due to capacitive coupling or direct contact between the ground plane 694 and the button 656.

It should be understood that it is generally less expensive (i.e., installation is simplified) to achieve capacitive coupling, between the button 656 and the ground plane 694 of the tri-band antenna module 650, than to directly couple the button 656 to the ground plane 694. However, in certain situations, the performance of the antennas 692 and 691 may be improved by physically connecting the button 656 directly to the ground plane 694 of the tri-band antenna module 650 using the conductor 689, for example, a strap of copper tape.

The mounting structure 636 is similar to the mounting foot 36 of FIG. 3, with the exception that the mounting structure 636 of FIG. 12 is configured to allow the tri-band antenna module 650 to be held at a fixed distance from the inside surface of windshield 620 and adjacent the button 656. As previously discussed, this allows the antenna module 650 to be maintained at a desired distance from the inside of the windshield 620 and allows the dielectric cover, provided by windshield 620, to be maintained substantially constant. The construction of the tri-band antenna module 650 is similar to the construction of the microwave antenna 50, shown in FIGS. 3 and 4. However, as is best shown in FIG. 20, the mounting structure 636 is configured to receive the button 656 such that the tri-band antenna module 650 is located adjacent the button 656. As with the puck 56 of FIG. 3, the mounting button 656, preferably, includes an inclined edge surface and a threaded aperture, for receiving a screw 664, formed in the surface of the button 656 opposite the surface that is adhered (e.g., with an adhesive) to the windshield 620.

A mounting portion (not shown in detail) of the mounting structure 636 also includes an aperture for engaging the button 656. Similar to the mounting portion 52 of FIG. 3, one edge of the aperture of the mounting structure 636 has a sloped profile to allow it to engage an inclined edge surface of the button 656. The size of the aperture is slightly smaller than the area of the surface of the button 656 and is opposite that which is secured to the windshield 620. The screw 664 is slid through an aperture (not shown in FIGS. 12 and 13) formed in the mounting portion and turned so as to thread into the threaded aperture in the button 656. It should be appreciated that the portion of the mounting structure 636 that retains the module 650 may also be formed as a separate component from the component that attaches the rearview mirror to the button 656. In either embodiment, a housing portion 654 is formed so as to allow the tri-band antenna module 650 to be located adjacent the button 656.

Figure 13:
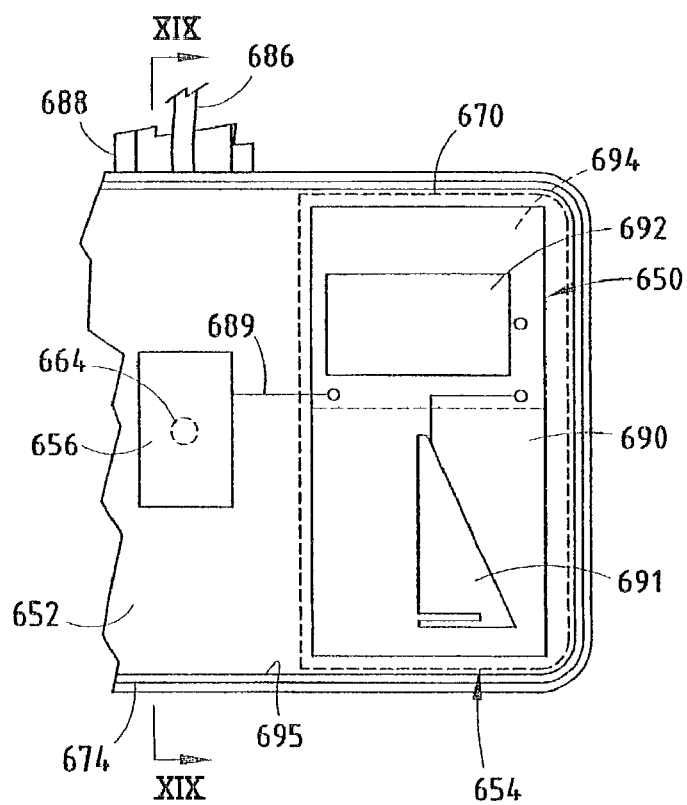
FIG. 13 is a partial front view of a mounting structure for a rearview assembly, according to one embodiment of the present invention.

The antenna housing portion 654 may include an aperture 670 having a generally rectangular shape for accommodating the tri-band antenna module 650. The aperture 670, when implemented, is provided so as to open outwards toward the inside surface of the windshield 620 through which signals from various satellites/cellular towers may pass to reach the antennas 691 and 692 of the tri-band antenna module 650. Preferably, the antenna module 650 is mounted in the aperture 670 so as to be substantially parallel to and slightly spaced apart (i.e., within a range of 1 to 3 mm) from the inner surface of the windshield 620. In a preferred embodiment, the antennas 691 and 692 of the antenna module 650 are mounted about 2 mm from the inside surface of the windshield 620. As is shown in FIGS. 12 and 13, the patch antenna 692 and the dual-band cellular antenna 691 are formed of a conductive material, e.g., copper, on one surface of dielectric substrate 690. On an opposite surface of the dielectric substrate 690, the ground plane 694 is formed substantially opposite the patch antenna 692. If desired, the antenna module 650 may also include a preamplifier circuit (see FIG. 16) for the patch antenna 692.

Additionally, a foam pad or other non-conductive substrate may be placed within the antenna housing portion 654 between the antenna module 650 and the inside surface of the windshield 620. As is shown best in FIG. 13, a gasket 674 may be provided about the periphery 695 of the structure 636 so as to provide for additional protection against moisture or debris between the inside surface of the windshield 620 and the antenna module 650. In addition to providing space for accommodating the antenna module 650, the mounting structure 636 may be configured to provide sufficient space for a receiving circuit 680 located on a printed circuit board (PCB) 682. In this configuration, the PCB 682 may be mounted directly behind the antenna module 650 so as to minimize the length of the antenna connectors connecting the antenna module 650 and the PCB 682.

Figure 14A:
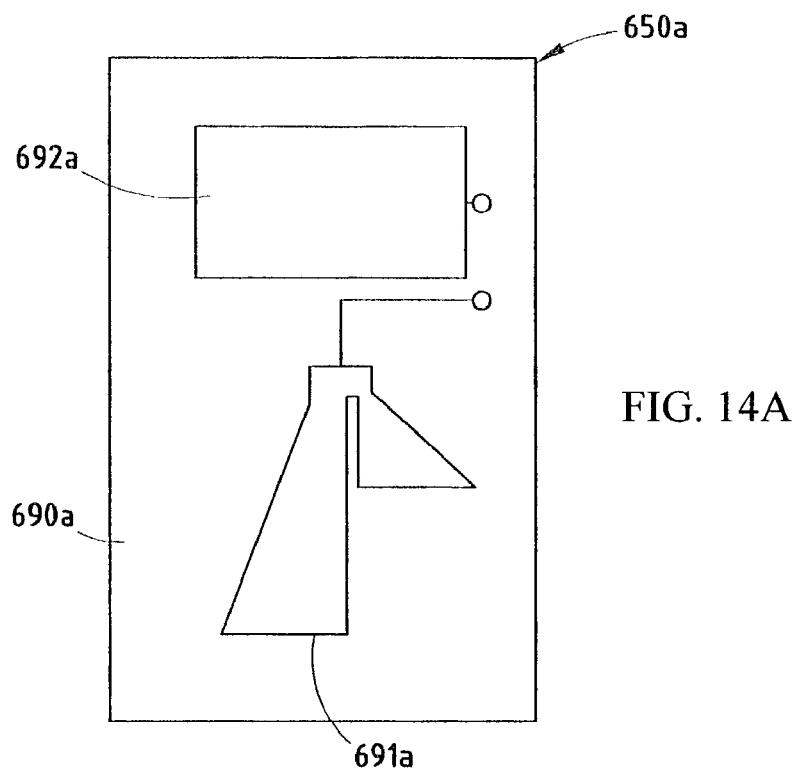
FIGS. 14A–14C are front, rear and side views, respectively, of a tri-band antenna module, according to one embodiment of the present invention.
Figures 14B, 14C:
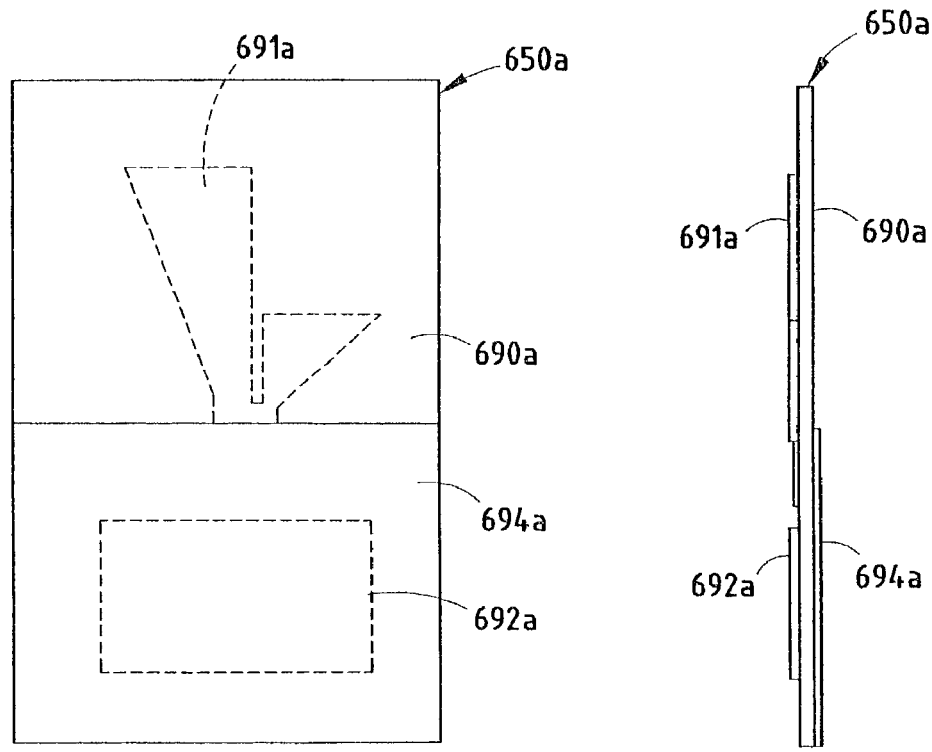

FIGS. 14A–14C illustrate front, rear and side views, respectively, of a tri-band antenna module 650a, according to one embodiment of the present invention. As shown in FIG. 14A, the antenna module 650a includes a dual-band cellular antenna 691a and a patch antenna 692a formed of a conductive material on one surface of a dielectric substrate 690a. As is shown in FIG. 14B, a ground plane 694a is formed on an opposite surface of the substrate 690a substantially opposite the patch antenna 692a. FIG. 14C shows a right side view of the antenna module 650a of FIG. 14A and further depicts the relationship of the ground plane 694a to the antennas 691a and 692a.

Figure 15A:
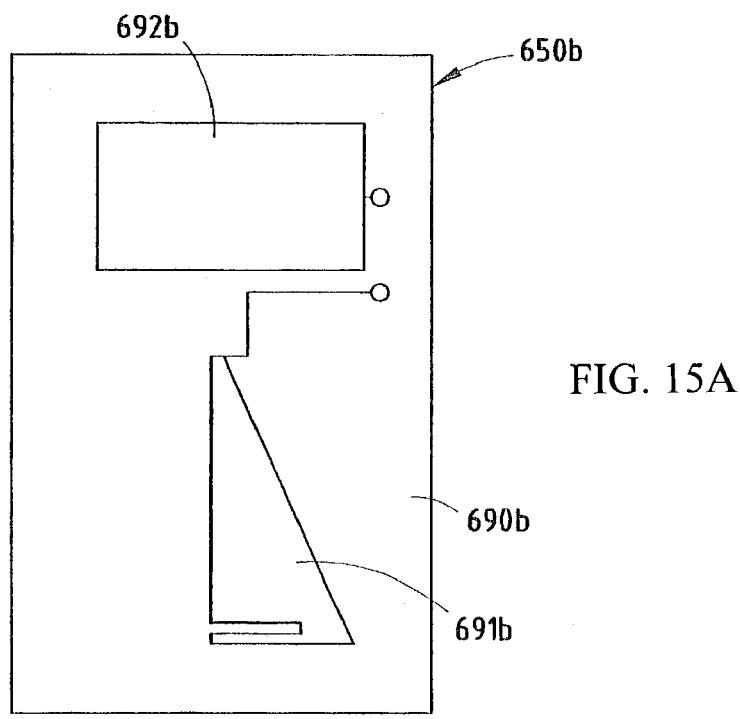
FIGS. 15A–15C are front, rear and side views, respectively, of a tri-band antenna module, according to another embodiment of the present invention.
Figures 15B, 15C:
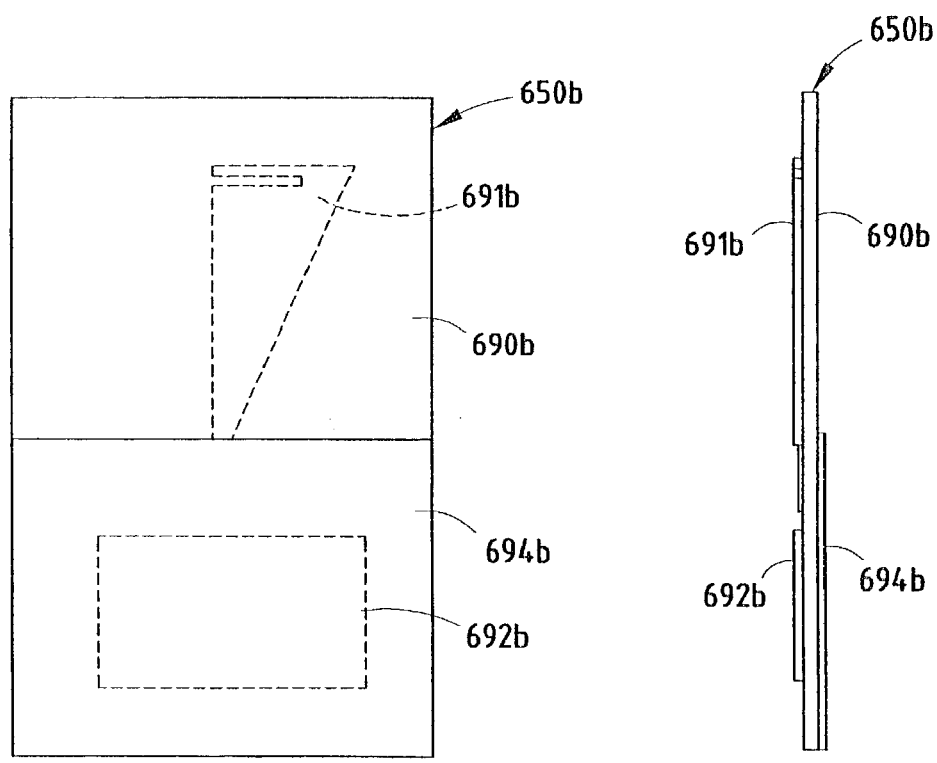

FIGS. 15A–15C depict front, rear and side views, respectively, of a tri-band antenna module 650b, according to another embodiment of the present invention. FIG. 15A shows a patch antenna 692b and a dual-band cellular antenna structure 691b formed on a dielectric substrate 690b. FIG. 15B depicts the opposite surface of the dielectric substrate 690b with a ground plane 694B formed on a section of the substrate 690b substantially opposite the patch antenna 692b. It will be appreciated that antenna structures, other than those shown in FIGS. 14A–14C and 15A–15C, can be implemented for the patch antenna and the dual-band cellular antenna providing that the antenna structures are capable of receiving an appropriate signal or signals. In a preferred embodiment, the patch antennas 692a and 692b operate at about 1.57542 GHz and the dual-band cellular antennas 691a and 691b operate in a first range from about 824 to 894 MHz and in the second range from about 1.85 to 1.98 GHz.

Figure 16:
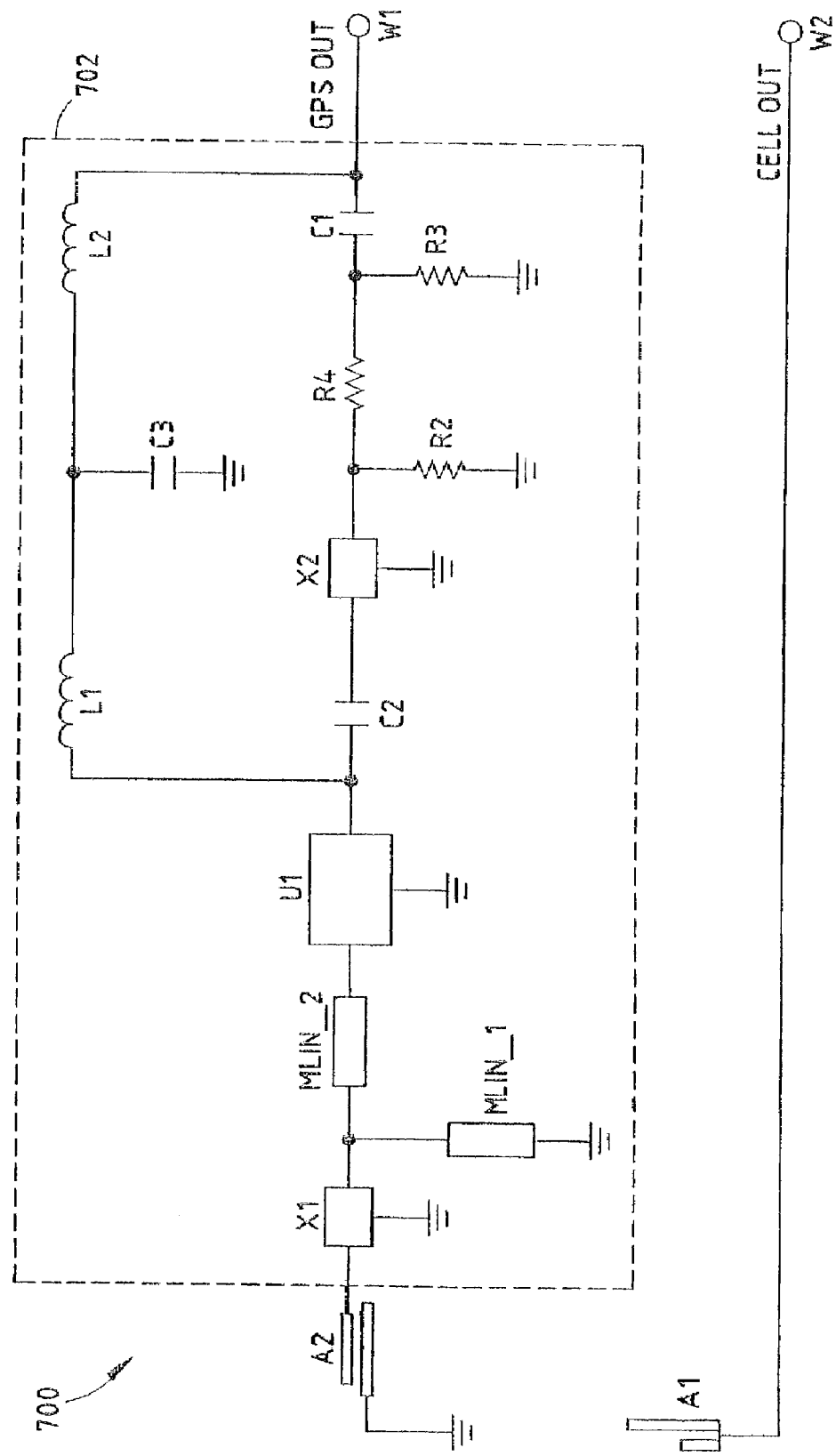
FIG. 16 is an electrical schematic of an exemplary preamplifier circuit for a patch antenna.

As is shown in FIG. 16, a preamplifier circuit 700 associated with a patch antenna A2 includes a filter X1 that is coupled between a preamplifier U1 and the patch antenna A2. The filter X1 functions to block cellular signals associated with dual-band cellular antenna A1 and thereby prevents the cellular signals from overloading the preamplifier U1. This is generally desirable as the signals received through the dual-band cellular antenna A1 are typically several orders of magnitude greater than the signals received through the patch antenna A2. In yet another embodiment, the preamplifier circuit 700 is contained within a shielded box 702, which prevents the circuit 700 from receiving radiation associated with the dual-band cellular antenna A1.

With reference again to FIG. 16, the patch antenna A2 is coupled to the filter X1, e.g., a 1.57542 GHz passband filter. An output of the filter X1 is coupled to an input of the amplifier U1 through a matching network, which includes transmission lines MLIN_1 and MLIN_2. An output of the amplifier U1 is coupled, through a 'T' network that includes inductor L1, capacitor C3 and inductor L2, to a GPS OUT terminal W1. The output of the amplifier U1 is also coupled to an input of filter X2 (e.g., a 1.57542 GHz passband filter), through a capacitor C2. An output of the filter X2 may be coupled through a resistive divider network, which includes resistors R2, R4 and R3, when desired. The output of the resistive divider network, when implemented, is coupled to the GPS OUT terminal W1 through a capacitor C1. As previously mentioned, the preamplifier circuit 700 may be part of the tri-band antenna module 650.

An advantage of mounting a tri-band antenna module as is disclosed in FIGS. 12–16 is that the windshield acts as a dielectric cover which reduces the size of a given antenna structure, as well as providing an antenna module that does not have to be individually attached to an inner surface of the windshield. According to another aspect of the invention, mounting the tri-band antenna module adjacent the conductive button advantageously enhances the gain of the tri-band antenna module as the area of the ground plane of the antennas is increased. By providing a filter between the patch antenna and its associated preamplifier, overloading of the patch antenna by signals associated with the co-located dual-band cellular antenna can be substantially reduced. The tri-band antenna module, according to the present invention, also simplifies antenna installation during both factory installation and when windshield replacement is required. Further, the antenna structure, which is generally smaller, is typically less visible to a driver as it is hidden from the line of the sight of the driver by the rearview assembly and is particularly useful for providing reception for a GPS receiver and a cellular telephone in that the GPS receiver is not jammed by the co-located dual-band cellular antenna.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention.

What is claimed is:

1. A rearview assembly for providing an image of a scene at a rear of a vehicle to a driver of the vehicle, the assembly comprising:
a mounting structure adapted for mounting to a conductive mounting button that is attached to an inside surface of a vehicle windshield; and
an antenna module mounted adjacent the conductive mounting button, the antenna module comprising a dual-band cellular antenna, wherein the dual-band cellular antenna is configured such that the mounting button increases the gain of the dual-band cellular antenna due to the fact that the mounting button increases the area of the ground plane.

2. The assembly of claim 1, further comprising a patch antenna, wherein the patch antenna operates at about 1.57542 GHz and the dual-band cellular antenna operates in a range from about 824 to 894 MHz and in another range from about 1.85 to 1.99 GHz.

3. The assembly of claim 1, further comprising a patch antenna, wherein the dual-band cellular antenna and the patch antenna share a common ground plane.

4. The assembly of claim 3, wherein the ground plane is located adjacent the mounting button and the patch antenna is oriented toward a roof of the vehicle.

5. The assembly of claim 1, further comprising a patch antenna, wherein the cellular antenna and the patch antenna are parallel to an inside surface of the vehicle windshield and located in a range of about 1 mm to 3 mm from the inside surface of the vehicle windshield.

6. The assembly of claim 5, wherein the cellular antenna and the patch antenna are parallel to an inside surface of the vehicle windshield and located about 2 mm from the inside surface of the vehicle windshield.

7. The assembly of claim 1, further including:
a patch antenna;
an amplifier for amplifying a signal received through the patch antenna; and
a filter coupled between the amplifier and the patch antenna, wherein the filter blocks cellular signals associated with the dual-band cellular antenna and thereby prevents the cellular signals from overloading the amplifier associated with the patch antenna.

8. A rearview assembly for a vehicle, the assembly comprising:
a mounting structure adapted for mounting to a conductive mounting button that is attached to an inside surface of a vehicle windshield; and
an antenna module mounted adjacent the conductive mounting button, the antenna module including a patch antenna and a dual-band cellular antenna, wherein the patch antenna operates at about 1.57542 GHz and the dual-band cellular antenna operates in a first range from about 824 to 894 MHz and in a second range from about 1.85 to 1.99 GHz, and wherein the dual-band cellular antenna is configured such that the mounting button increases the gain of the dual-band cellular antenna due to the fact that the mounting button increases the area of the ground plane.

9. The assembly of claim 8, further comprising a patch antenna, wherein the ground plane is located adjacent the mounting button and the patch antenna is oriented toward a roof of the vehicle.

10. The assembly of claim 8, further comprising a patch antenna, wherein the cellular antenna and the patch antenna are parallel to an inside surface of the vehicle windshield and located in a range of about 1 mm to 3 mm from the inside surface of the vehicle windshield.

11. The assembly of claim 10, further comprising a patch antenna, wherein the cellular antenna and the patch antenna are parallel to an inside surface of the vehicle windshield and located about 2 mm from the inside surface of the vehicle windshield.

12. The assembly of claim 8, further including:
a patch antenna;

an amplifier for amplifying a signal received through the patch antenna; and a filter coupled between the amplifier and the patch antenna, wherein the filter blocks cellular signals associated with the dual-band cellular antenna and thereby prevents the cellular signals from overloading the amplifier associated with the patch antenna.

13. A rearview assembly for providing an image of a scene at a rear of a vehicle to a driver of the vehicle, the assembly comprising:

a mounting structure adapted for mounting to a mounting button that is attached to an inside surface of a vehicle windshield;

a tri-band antenna module mounted adjacent the mounting button, the antenna module including a patch antenna and a dual-band cellular antenna;

an amplifier for amplifying a signal received through the patch antenna; and a filter coupled between the amplifier and the patch antenna, wherein the filter blocks cellular signals associated with the dual-band cellular antenna and thereby prevents the cellular signals from overloading the amplifier associated with the patch antenna, wherein the dual-band cellular antenna is configured such that the mounting button increases the gain of the dual-band cellular antenna due to the fact that the mounting button increases the area of the ground plane.

14. The assembly of claim 13, further comprising a patch antenna, wherein the patch antenna operates at about 1.57542 GHz and the dual-band cellular antenna operates in a first range from about 824 to 894 MHz and in a second range from about 1.85 to 1.99 GHz.

15. The assembly of claim 13, further comprising a patch antenna, wherein the dual-band cellular antenna and the patch antenna share a common ground plane.

16. The assembly of claim 15, wherein the ground plane is located adjacent the mounting button and the patch antenna is oriented toward a roof of the vehicle.

17. The assembly of claim 13, further comprising a patch antenna, wherein the cellular antenna and the patch antenna are parallel to an inside surface of the vehicle windshield and located in a range of about 1 mm to 3 mm from the inside surface of the vehicle windshield.

18. The assembly of claim 17, wherein the cellular antenna and the patch antenna are parallel to an inside surface of the vehicle windshield and located about 2 mm from the inside surface of the vehicle windshield.

19. The assembly of claim 13, wherein the antenna module is located within the mounting structure.

20. The assembly of claim 15, wherein the mounting button is a conductive mounting button, and wherein the common ground plane is physically coupled to the conductive mounting button with a conductor.

21. The assembly of claim 13, wherein the mounting button is electrically conductive.

* * * * *